(12) United States Patent
Tajima et al.

(10) Patent No.: US 6,485,048 B2
(45) Date of Patent: Nov. 26, 2002

(54) HEAD PROTECTION AIR BAG APPARATUS

(75) Inventors: Hiroyuki Tajima; Chiharu Totani; Yoshiyuki Sakuma; Takuji Nagata; Yasuyuki Osawa, all of Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/852,091

(22) Filed: May 10, 2001

(65) Prior Publication Data

US 2001/0040361 A1 Nov. 15, 2001

(30) Foreign Application Priority Data

May 11, 2000 (JP) .................................... 2000-138958
May 26, 2000 (JP) .................................... 2000-157293

(51) Int. Cl.⁷ .............................................. B60R 21/16
(52) U.S. Cl. .................................. 280/728.2; 280/730.2
(58) Field of Search .......................... 280/728.2, 730.1, 280/730.2

(56) References Cited

U.S. PATENT DOCUMENTS

| 5,921,575 | A |   | 7/1999 | Kretschmer et al. |           |
|-----------|---|---|--------|-------------------|-----------|
| 6,079,735 | A | * | 6/2000 | Fallmann et al.   | 280/730.2 |
| 6,302,434 | B2| * |10/2001 | Nakajima et al.   | 280/730.1 |
| 6,333,515 | B1| * |12/2001 | Kubota et al.     | 280/728.1 |

FOREIGN PATENT DOCUMENTS

| DK | 19844118    | 4/1999  |
| DK | 19841340    | 3/2000  |
| DK | 29822768    | 6/2000  |
| EP | 0983915     | 3/2000  |
| FR | 2784647     | 4/2000  |
| JP | 10-138858   | 5/1998  |
| JP | 11-321532   | 11/1999 |
| WO | WO 96/26087 | 8/1996  |

* cited by examiner

*Primary Examiner*—Paul N. Dickson
*Assistant Examiner*—Faye M. Fleming
(74) *Attorney, Agent, or Firm*—Pillsbury Winthrop LLP

(57) ABSTRACT

A head protection air bag apparatus comprises an air bag, an air bag cover for covering the air bag, an inflator for supplying the air bag with a gas for inflation, and an assist grip. The inflator is fixed to a body of a vehicle at a location toward the exterior side of a vehicle relative to the assist grip. The assist grip is provided on its exterior surface with a cover layer having the characteristic of a cushion, so that an impact with the inflator will be cushioned by the assist grip.

24 Claims, 23 Drawing Sheets

HEAD PROTECTION AIR BAG APPARATUS

This application claims priority from Japanese application 2000-138958 filed May 11, 2000, and Japanese application 2000-157293 filed May 26, 2000, which are hereby incorporated by reference into this application.

BACKGROUND OF THE INVENTION

1. Field of the Invention

The present invention relates to a head protection air bag apparatus mounted in a vehicle. The head protection air bag apparatus is provided with a folded air bag in a predetermined location on the interior side of a vehicle.

2. Description of the Related Art

Conventionally, in this kind of head protection air bag apparatus, an air bag is folded to be housed on an upper edge side of the periphery of an opening on the interior or inner side of a vehicle, that is, in a periphery from a front pillar portion to a roof side rail portion, as described in the Japanese Laid-Open Patent Application No. Hei 11-321532.

A gas for inflation supplied by an inflator flows into the air bag from either its front end side or rear end side. Accordingly, it takes a long time for the gas for inflation to reach the terminal end of the air bag, which is located away from the inflator.

The length of the air bag should be long in a front-rear direction when the air bag is mounted on a vehicle, in vehicles which include several rows of seats for passengers. In this case, it takes a long time for the gas for inflation to reach the air bag terminal end.

In order to solve this problem, it can be considered to shorten the distance between the inflator and the terminal end in a front-rear direction of the air bag, as described in WO 96/26087. In WO 96/26087, the inflator is disposed on the upper edge side of a periphery of an opening on the inner side of a vehicle between the front pillar portion and the rear pillar portion, that is, in the roof side rail portion.

The inflator is made of a metal having high rigidity. Thus, taking impacts between the inflator and a passenger into account, a cover material for covering the inflator to function as a cushion is separately required when disposing the inflator in the roof side rail portion. Preparing the cover material, however, increases the number of components of the air bag as well as the number of processes for installing the air bag apparatus in a vehicle.

In a conventional head protection air bag apparatus, the air bag is folded to be housed on an upper edge side of a periphery of an opening on the inner side of a vehicle so as to extend from the front pillar portion to the rear side passing over the center pillar portion, as described in the Japanese Laid-Open Patent Application No. Hei 10-138858.

The air bag in the above Japanese Laid-Open Patent Application No. Hei 10-138858 is in a folded shape and covered by a door portion of an air bag cover at a location of a roof side rail portion on an upper edge side of an opening on the inner side of a vehicle. The door portion is disposed on a lower edge side of a roof head lining. The air bag, which has been developed and inflated, pushes and opens the door portion of the air bag cover. The air bag is developed and inflated so as to cover the inner side of a vehicle of a center pillar garnish at a location of the center pillar portion. The center pillar garnish is disposed on the inner side of a vehicle of the center pillar portion.

In the conventional head protection air bag apparatus, however, a lower edge portion of the air bag cover door portion is connected to the upper edge portion of the pillar garnish of the center pillar portion. The lower edge portion of the cover door portion includes a curved portion toward the exterior, or the outer side, of a vehicle. Thus, the door portion must climb over the upper edge portion of the pillar garnish to be opened when the air bag pushes and opens the door portion. As a result, in the conventional head protection air bag apparatus, the door portion is difficult to open smoothly and thereby, there is a need for improving the quick development and inflation of the air bag.

SUMMARY OF THE INVENTION

One aspect of the invention is to provide a head protection air bag apparatus capable of covering an inflator without increasing the number of components with a cushion characteristic when the inflator is disposed in a roof side rail portion or the like.

Another aspect of the invention is to provide a head protection air bag apparatus in which an opening operation of a lower edge portion of an air bag cover, which abuts an upper edge portion of a pillar garnish, is made free of restriction so that development and inflation of the air bag can be completed quickly.

The first aspect of the invention can be achieved by a head protection air bag apparatus having a following structure. This head protection air bag apparatus comprises an air bag, an air bag cover for covering the air bag, an inflator for supplying the above air bag with a gas for inflation, fixing elements for fixing the inflator to a body of the vehicle, and an assist grip. The air bag is covered by the air bag cover. The air bag is folded and housed on the exterior side of the vehicle, relative to the air bag cover, and the gas for inflation from the inflator is emitted into the air bag so that the air bag pushes and opens the air bag cover as the air bag is developed and inflated. The inflator is disposed at a location toward the exterior, or outer side, of the vehicle body relative to the assist grip when fixed to the vehicle body.

In the head protection air bag apparatus according to an embodiment of the invention, the assist grip is used as a cover material of the inflator. The assist grip, which is properly provided with a core material made of a metal, is provided on its surface side with a cushioning cover layer made of a soft synthetic resin such as soft vinyl chloride and urethane.

Therefore, a passenger will impact the assist grip, which has the characteristic of a cushion, in situations when the passenger would impact the inflator. As a result, the impact of the passenger is less injurious than an impact in situations when no assist grip is provided.

The assist grip itself is a component mounted in the roof side rail portion or the like of a vehicle. Thus, the use of the assist grip in the head protection air bag apparatus does not increase the number of components mounted in a vehicle.

Therefore, in the head protection air bag apparatus according to this embodiment of the invention, the inflator can be covered without increasing the number of components. The inflator is covered with an assist grip having the characteristic of a cushion even when the inflator is disposed in the roof side rail portion.

A condition of a location of the inflator disposed toward the outer, or exterior side of a vehicle of the assist grip is that a passenger does not impact the inflator such as would occur in situations where only the air bag cover exists in between the passenger and the inflator. Accordingly, the inflator may be disposed either toward the exterior side of a vehicle in a horizontal direction of the assist grip, or also toward the exterior side of a vehicle in an obliquely upper or lower direction relative to the assist grip.

In this head protection air bag apparatus, it is desirable that the inflator and the assist grip are fixed to the vehicle body by means of common fixing elements.

In this arrangement, the inflator and the assist grip are fastened together to be fixed to the body by means of the common fixing elements. In such an arrangement, the numbers of components and installation processes in installing the inflator and the assist grip in the body is decreased.

Further, the inflator, the assist grip and the air bag cover may be fixed to the body by means of the common fixing elements. In this arrangement, the air bag cover is also fastened together with the inflator and the assist grip to be fixed to the body. In such arrangement, the numbers of components and installation processes in installing the inflator, the assist grip, and the air bag cover in the body can be decreased.

Moreover, in the first head protection air bag apparatus, a unitary air bag installation body may be formed. This air bag installation body is the assist grip, the air bag, the inflator, and the air bag cover are coupled together into a unitary body to be installed into the vehicle body. In such an arrangement, the air bag apparatus is installed within the vehicle body through the installation of the installation body. As a result, the installation operation required for installing the air bag apparatus in a vehicle is be improved.

A decorative or functional design characteristics of the inner side of a vehicle would not be decreased when interior decoration of the roof side rail garnish and the roof head lining is used for forming the air bag cover.

The second aspect of the invention is achieved by a head protection air bag apparatus having a following structure. This head protection air bag apparatus comprises an air bag and an air bag cover. The air bag is folded and housed at an upper location of a pillar portion on the interior, or inner, side of the vehicle body. The air bag covers a pillar garnish disposed on the interior side of the pillar portion when developing and inflating. The air bag cover is configured to move between a closed and an open position. In the closed position, the cover covers the folded air bag and is opened when pushed by the developed and inflated air bag. A lower edge portion of the air bag cover is disposed toward the vehicle interior relative to an upper edge portion of the pillar garnish, and is abutted to the pillar garnish.

In the second head protection air bag apparatus according to the invention, a lower portion of the air bag can immediately open and move to the inner side of a vehicle without climbing over the upper edge portion of the pillar garnish when the developed and inflated air bag pushes the air bag cover.

Accordingly, in the second head protection air bag apparatus according to the invention, an opening operation of the lower edge portion of the air bag cover to be connected to the upper edge portion of the pillar garnish would be smooth, so that development and inflation of the air bag can be completed quickly.

In the second head protection air bag apparatus, it is desirable that, when the pillar garnish is provided with a general portion disposed below the upper edge portion of the garnish, the lower edge portion of the air bag cover is abutted to the pillar garnish in a manner so as to be in a same plane with the general portion of the pillar garnish. In such an arrangement, the decorative and functional design characteristics of the air bag cover and the pillar garnish do not decrease.

Further, in the second head protection air bag apparatus, it is desirable that, in situation when the vehicle comprises a front pillar portion, a rear pillar portion and a middle pillar portion between the front pillar portion and the rear pillar portion, the air bag cover is provided on the inner side of the vehicle and extends from the front pillar portion to the rear pillar portion as one integrated body. In such an arrangement, the air bag cover continuously covers roughly the entire upper edge side of a periphery of an opening on the inner side of a vehicle. Thus, the decorative and functional design characteristics of the inner side of a vehicle are improved compared with situations when the air bag cover is disposed in parts on the inner side of a vehicle.

In the second embodiment of the head protection air bag apparatus, an air bag installation body is also formed. This air bag installation body is the air bag and the air bag cover coupled together for installation in a vehicle body as a unitary body. In such an arrangement, the air bag apparatus is installed within the vehicle body through the installation of the installation body. As a result, the installation operation required for installing the air bag apparatus in a vehicle is improved.

Moreover, in the second head protection air bag apparatus, the upper edge portion of the pillar garnish may be connected to the body so as to fill a space between the pillar garnish and the body. In such an arrangement, the upper edge portion of the pillar garnish prevents the air bag from entering between the pillar garnish and the body when the air bag is developed and inflated, so that the air bag is directed to the lower edge portion side of the air bag cover. Accordingly, the air bag can be smoothly projected to the inner side of a vehicle.

In the above arrangement, the air bag cover comprises a door portion, to be opened when pushed by the air bag, and a general portion disposed above the door portion. It is desirable that the general portion of the air bag is provided with a lateral wall portion for filling a space between the general portion of the air bag and the body. The lateral wall is disposed above the location between the pillar garnish and the vehicle body where the folded air bag is disposed. In such an arrangement, the lateral wall portion can prevent the air bag from entering between the general portion of the air bag cover and the vehicle body, when the air bag is developed and inflated. Accordingly, the air bag is directed to the door portion of the air bag cover. Thus, the air bag smoothly projects to the inner side of a vehicle.

In the second head protection air bag apparatus, it is arranged that the upper edge portion of the air bag cover covers the interior side of a lower edge portion of the roof head lining that is disposed above the air bag cover. That is, the upper edge portion of the air bag cover is disposed on the interior side of the vehicle, relative to the lower edge portion of the roof head lining, and abutted to the roof head lining. In such an arrangement, the roof head lining can be mounted in a vehicle even when a terminal treatment such as trimming of the roof head lining lower edge portion is insufficient. This is because the upper edge portion of the air bag cover covers the roof head lining lower edge portion. As a result, the terminal treatment of the roof head lining lower edge portion can be easily performed through this design. A decrease of the appearance of the roof head lining can also be controlled.

DESCRIPTION OF PREFERRED EMBODIMENTS

The invention will be described hereinafter on the basis of embodiments shown in drawings. The invention is not limited to the embodiments. Any modification of an element in the claims or equivalents to the element are included within a range of the claims.

Figure 1:
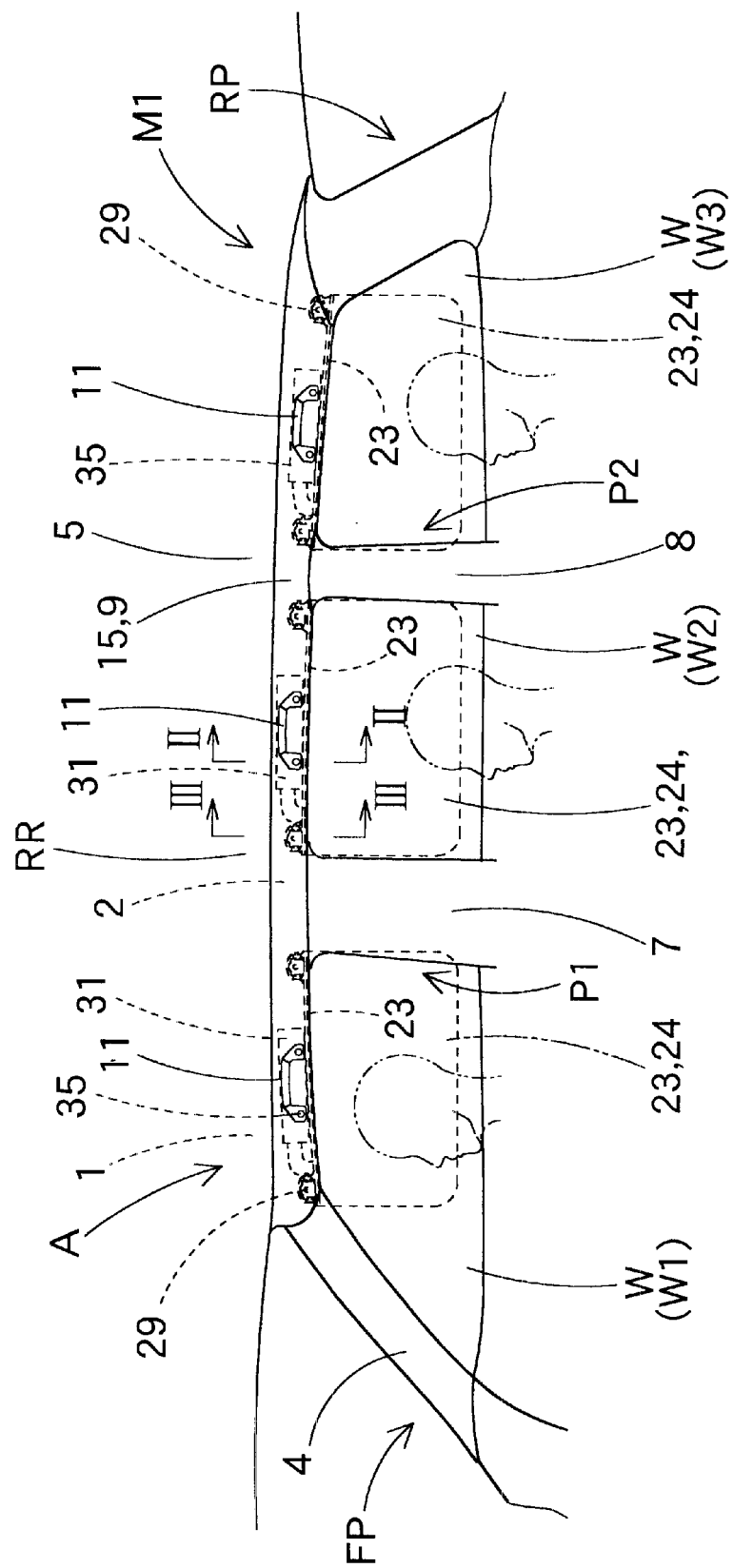
FIG. 1 is a front view of a head protection air bag apparatus in the first embodiment of the invention from the interior side of a vehicle.

A head protection air bag apparatus Ml shown in FIGS. 1 to 4 in the first embodiment is mounted in a vehicle having three rows of seats, as shown in FIG. 1. The head protection air bag apparatus M1 comprises three folded air bags 23. These air bags 23 are provided in the upper edge side of the periphery of an opening W of a door or a window portion on the interior side of a vehicle. Specifically, the above air bags 23 are provided in a roof side rail portion RR, which extents from a front pillar portion FP through a first and second middle pillar portions P1 and P2 to the vicinity of a rear pillar portion RP.

The head protection air bag apparatus M1 comprises an air bag 23, an inflator 31, an installation bracket 28, an air bag cover 15 and an assist grip 11.

Figure 2:
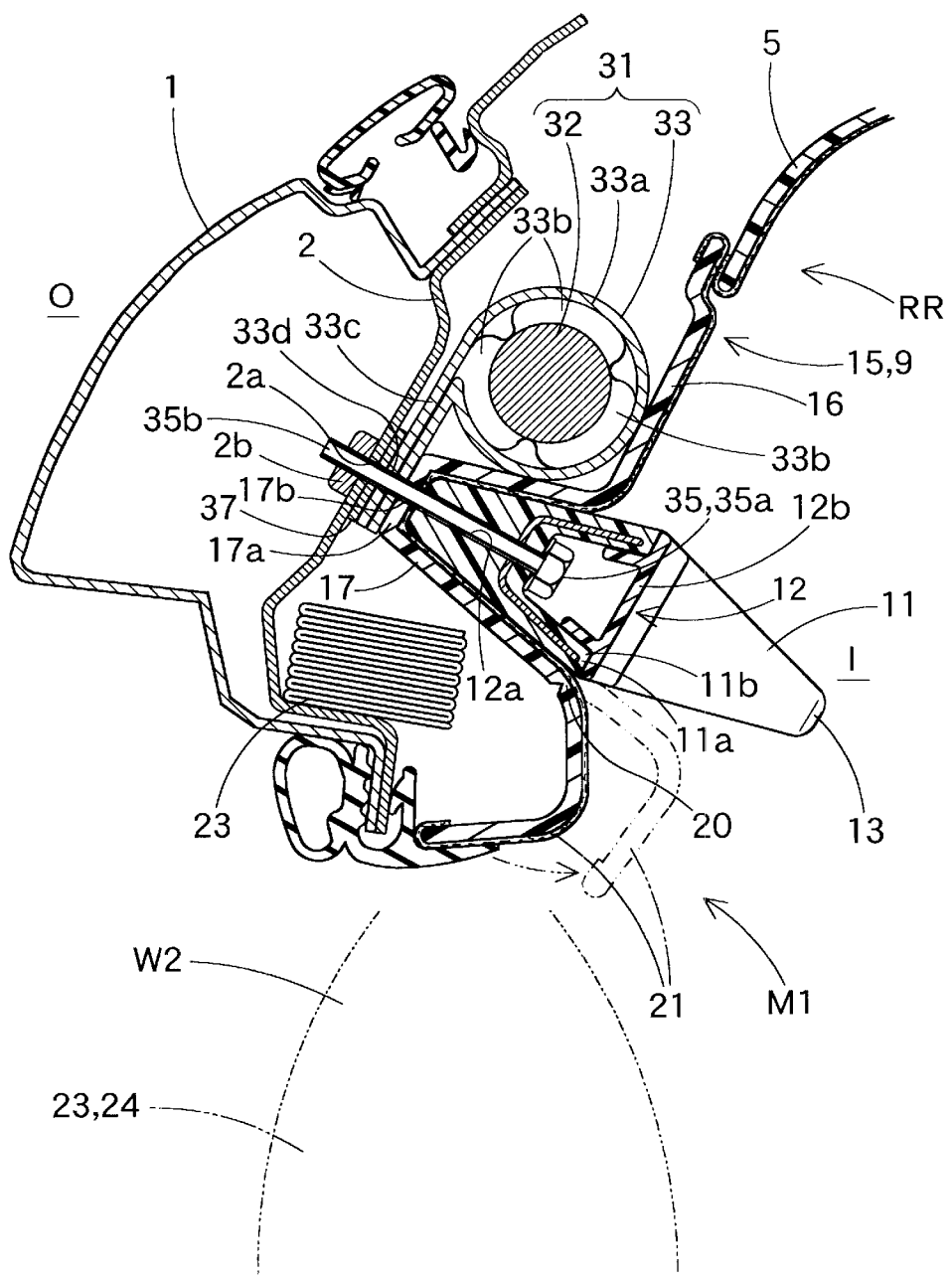
FIG. 2 is a sectional view of a portion II—II shown in FIG. 1.
Figure 3:
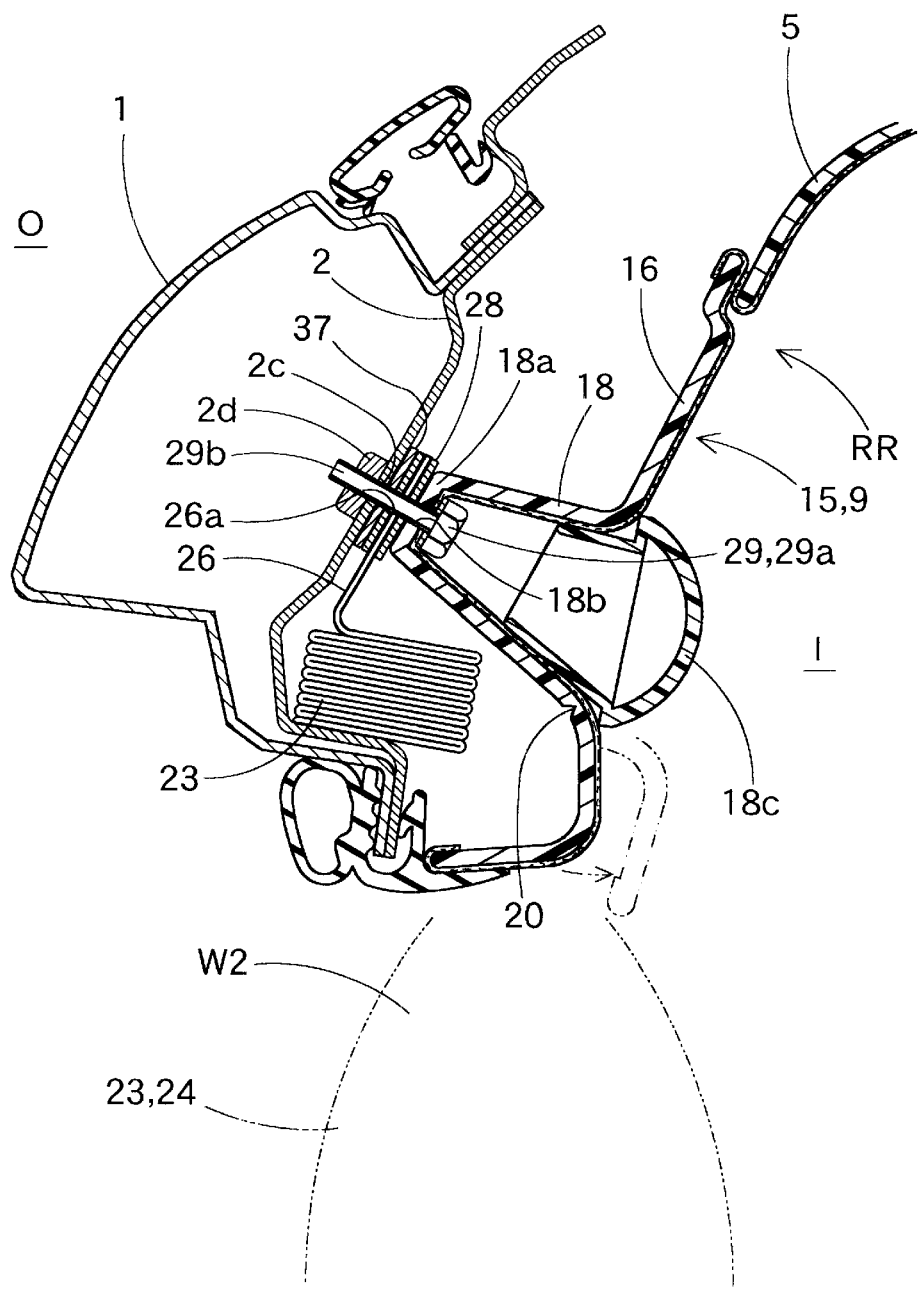
FIG. 3 is a sectional view of a portion III—III shown in FIG. 1.
Figure 4:
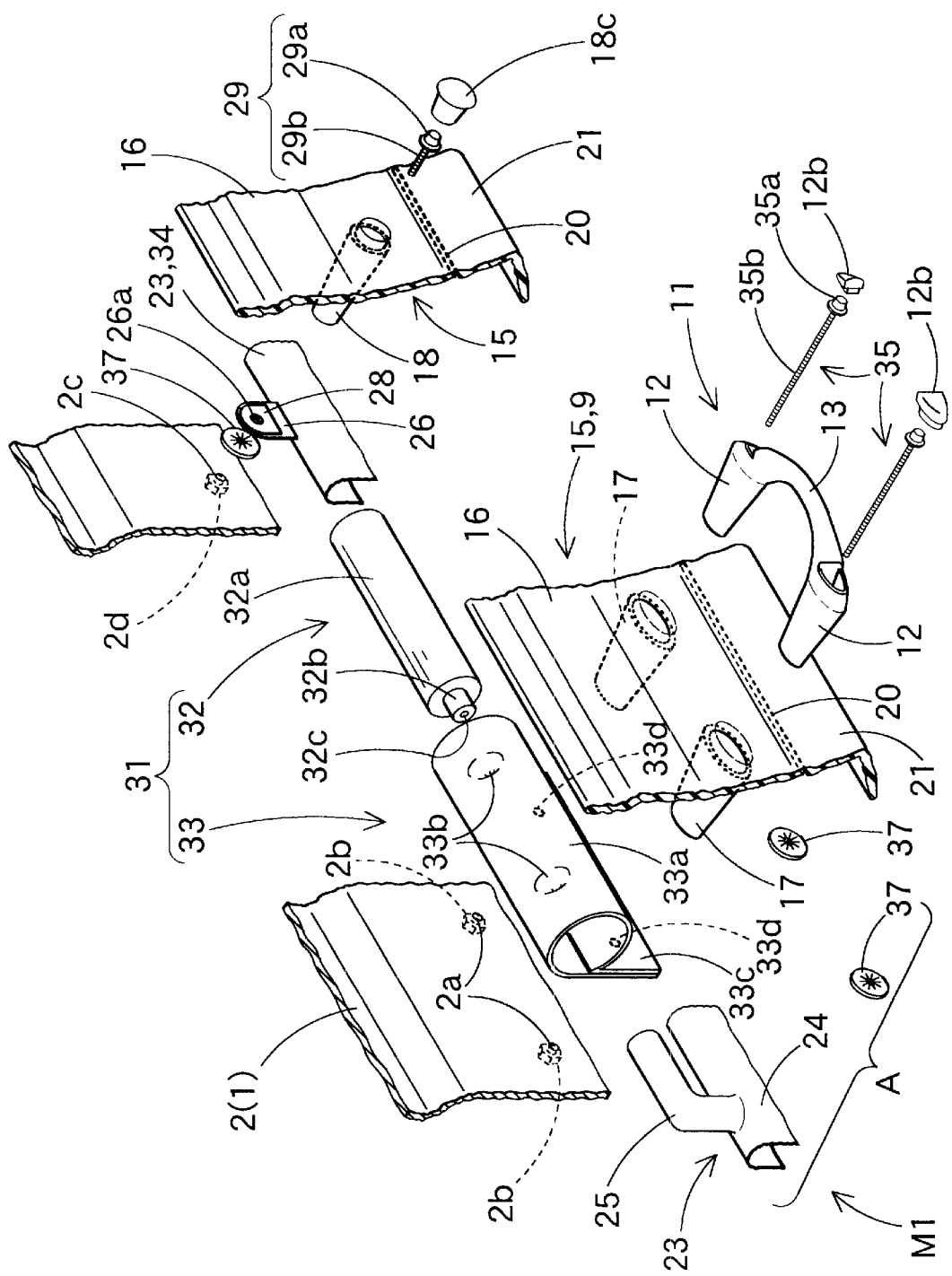
FIG. 4 is an exploded perspective view of the principal part in the first embodiment.

Each air bag 23 is provided so as to cover respective openings W1, W2, and W3 of each window portion, as shown in FIGS. 1 to 4. Each air bag 23 is folded and housed on the upper edge side of a periphery of respective openings W1, W2, and W3, respectively. Each air bag 23 is woven into a shape of a bag with a thread made of polyamide or polyester, for example, and comprises a main body portion 24 and an installation portion 26. The main body 24 is in a roughly oblong board shape and inflates when a gas for inflation flows into from the inflator 31. The installation portion 26, which is a flange extending from the main body 24, is provided in the front and rear parts on an upper edge side of the main body portion 24. A roughly cylindrical gas flow portion 25 is provided on the upper side of the main body portion 24 so that a gas for inflation can flow into from the inflator 31. An installation hole 26a, through which an installation bolt 29 passes, is provided in each installation portion 26, as shown in FIGS. 3 and 4. Each installation portion 26 is further provided with an installation bracket 28 made from a metal plate. Each installation portion 26 is installed together with the installation bracket 28 by means of the installation bolt 29 to an inner panel 2 on the roof side rail portion RR. The inner panel 2 is provided with a nut 2d for screwing the bolt 29. The nut 2d is fixed in a location of an installation hole 2c.

The inflator 31 supplies the folded air bag 23 with a gas for inflation, as shown in FIGS. 1, 2 and 4. The inflator 31 is disposed on a side of the upper edge of a periphery of respective openings W1, W2 and W3 toward the exterior of the vehicle O, relative to the assist grip 11, so as to be hidden by the assist grip 11. In this embodiment, each inflator 31 is disposed toward the exterior of the vehicle O in an oblique direction above the assist grip 11. Each inflator 31 comprises a main body portion 32 and a bracket portion 33. The main body portion 32 is in a cylindrical shape and emits a gas for installation. The bracket portion 33 is made from a metal plate and used for installing the main body portion 32 in the inner panel 2, in the roof side rail portion RR. The main body portion 32 comprises a large diameter portion 32a and a small diameter portion 32b. The small diameter portion 32b comprises a gas emitting exit 32c. The bracket portion 33 comprises a roughly cylindrical grip portion 33a and an installation portion 33c, which is a flange in a shape of a roughly oblong plate. The grip portion 33a, comprises a sleeve that grips and holds the main body portion 32. On an inner circumference side of the grip portion 33a, there is a plurality of pressing portions 33b projected for gripping the main body portion 32. These pressing portions 33b shorten a diameter by plastic deformation to press an outer circumference surface of the main body portion 32. As the result, these pressing portions 33b grip the main body portion 32. The installation portion 33c is in a shape of a roughly oblong plate and extends downward from the grip portion 33a. The installation portion 33c comprises installation holes 33d provided in two places. An installation bolt 35 passes through each installation hole 33d. The installation bolts 35 are used for installing the inflator 31 in the interior panel 2 on a side of a body 1. The interior panel 2 is provided with a nut 2b for screwing the bolt 35. The nut 2b is fixed in a location of an installation hole 2a.

The gas flow portion 25 of each air bag 23 is coupled to a small diameter portion 32b of the inflator main body portion 32a. Each gas flow portion 25 uses a clamp not shown in drawings to be connected to the small diameter portion 32b.

The air bag cover 15 is longitudinally disposed in the location of the roof side rail portion RR extending from the front pillar portion PF through the first and second middle pillar portions P1 and P2 to the rear pillar portion RP as shown in FIGS. 1 through 4. The air bag cover 15 is disposed between the lower edge side of a roof head lining 5 and the upper edge side of the openings W1, W2 and W3. The air bag cover 15 is made of a synthetic resin and comprises a door portion 21 and a general portion 16. The door portion 21 is disposed on the lower edge side of the cover 15 so that each air bag 23 can press and open the door portion 21 when the air bag 23 is developed and inflated. The general portion 16 is disposed on the upper side of the door portion 21. On the upper edge side of the door portion 21, a thin hinge portion 20 is formed so that the door portion opens smoothly.

Two kinds of roughly cylindrical installation portions 17 and 18, which are projected toward the exterior side of a vehicle O, are formed in the general portion 16. The installation portions 17 and 18 comprise bottom wall portions 17a and 18a that are projected toward the exterior side of a vehicle O. The bottom wall portions 17a and 18a comprise installation holes 17b and 18b. Each installation portion 17 is a portion to be fixed to the inner panel 2. Each installation portion is a projection that includes an interior socket. The installation portion 17 is fastened on the inner panel 2 together with an installation portion 12 of the assist grip 11, and the bracket portion 33 of the inflator 31, through the use of an installation bolt 35. Each installation portion 18 is also a portion to be fixed to the inner panel 2. The installation portion 18 is fastened on the inner panel 2, together with the installation portion 26 of each air bag 23, through the installation bolt 29. Each installation portion 18 may include a fixed cap 18c. The cap 18c hides the bolt 29, which is used for fastening the installation portion 18 and the air bag installation portion 26 together on the inner panel 2.

The assist grip 11 is provided in the vicinity of the upper side of a center part of respective openings W1, W2 and W3, as shown in FIGS. 1, 2 and 4. Each assist grip 11 includes a hand grasping grip portion 13 for gripping by a passenger and an installation portion 12 disposed on both ends of the grip portion 13. Each assist grip 11 comprises a core material 11a made from a metal plate and a cover layer 11b. The core material 11a is used for maintaining the shape of the assist grip 11. The cover layer 11b is a thick layer made of a soft synthetic resin such as soft vinyl chloride and urethane, which covers the core material.

Each installation portion 12 comprises an installation hole 12a through which the installation bolt 35 passes. Each installation portion 12 is roughly formed in a shape of a section of a cone so as to be fitted into a socket location on the interior side of a vehicle of each installation portion 17 of the air bag cover 15. A cap 12b is typically fixed in each installation hole 12a. The cap 12b hides the bolt 35, which is used for fastening the installation portion 12, the installation portion 17, and the installation portion 33c to the inner panel 2.

Next, the installation procedure to install the head protection air bag apparatus M1 of the first embodiment in a vehicle will be described. First, an air bag installation body A is formed. In forming this installation body A, each air bag 23 is typically, initially folded. In folding the air bag 23, the flat developed air bag 23 in a deflated condition is folded in a shape of bellows with convex and concave folding lines so that the lower edge side of the main body portion 24 is adjacent to the upper edge side thereof. After the air bag 23 is folded, a tape material 27, which is capable of being torn and which is for preventing the air bag 23 from losing its folded shape, (referring to FIGS. 5 and 6) is wrapped at a predetermined interval. After the air bag 23 is folded, the installation bracket 28 is also installed in each installation portion 26.

Each gas flow portion 25 is not folded. Then, the small diameter portion 32b of each inflator main body portion 32 is connected to the gas flow portion 25 by the use of a clamp not shown in the drawings. A diameter of the inflator grip portion 33a is shortened so that the bracket portion 33 would hold the main body portion 32.

Figure 5:
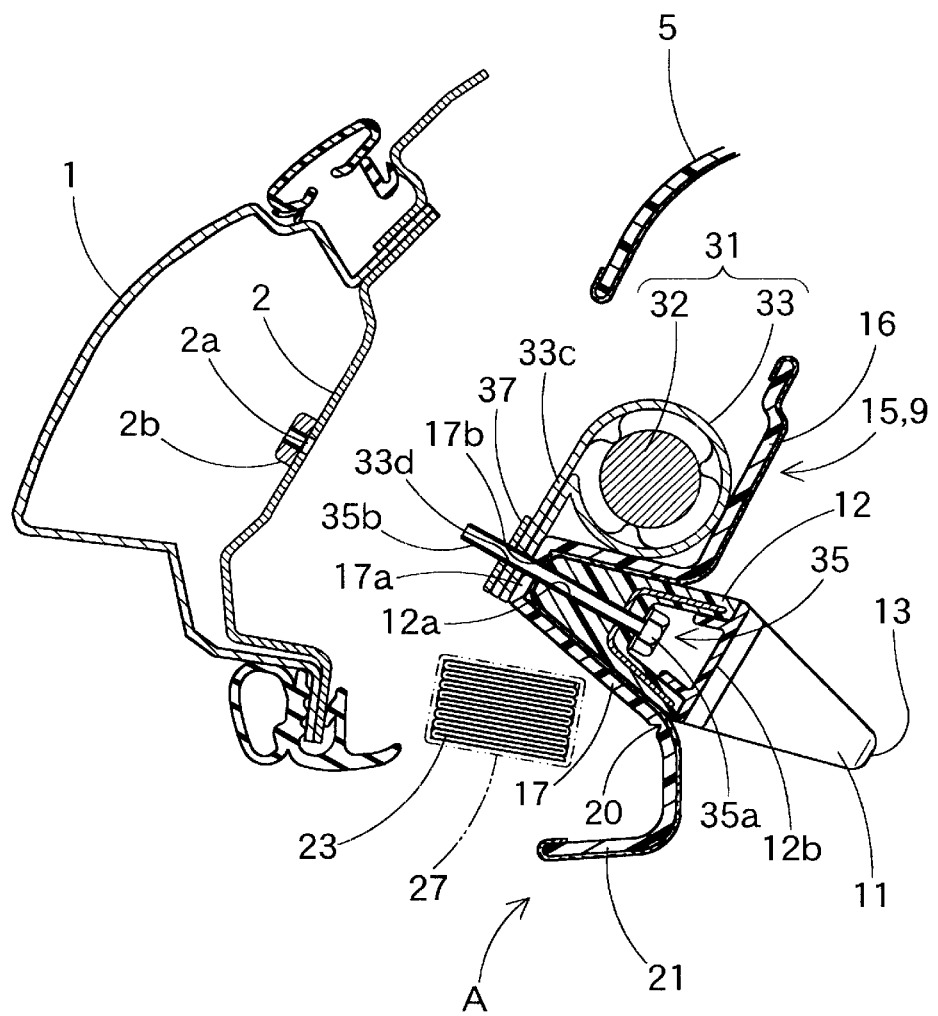
FIG. 5 is a sectional view of an air bag installation body in the first embodiment, which corresponds to a portion shown in FIG. 2.

The inflator bracket portion 33 is disposed in a location toward the exterior side of a vehicle O of each installation portion 17 of the air bag cover 15, as shown in FIG. 5. The installation portion 12 of the assist grip 11 is fitted into a socket within each installation portion 17. After that, each installation bolt 35 passes through the installation holes 12a, 17b and 33d. Then, a washer-shaped spring plate nut 37 is fitted into a male screw portion 35b of each bolt 35. Further, the cap 12b is fitted into a periphery of the installation hole 12a on the interior side of a vehicle. The spring plate nut 37 is formed from a thin spring plate. The nut 37 can be easily fitted into the male screw portion 35b so that the nut 37 would be unable to drop off.

Figure 6:
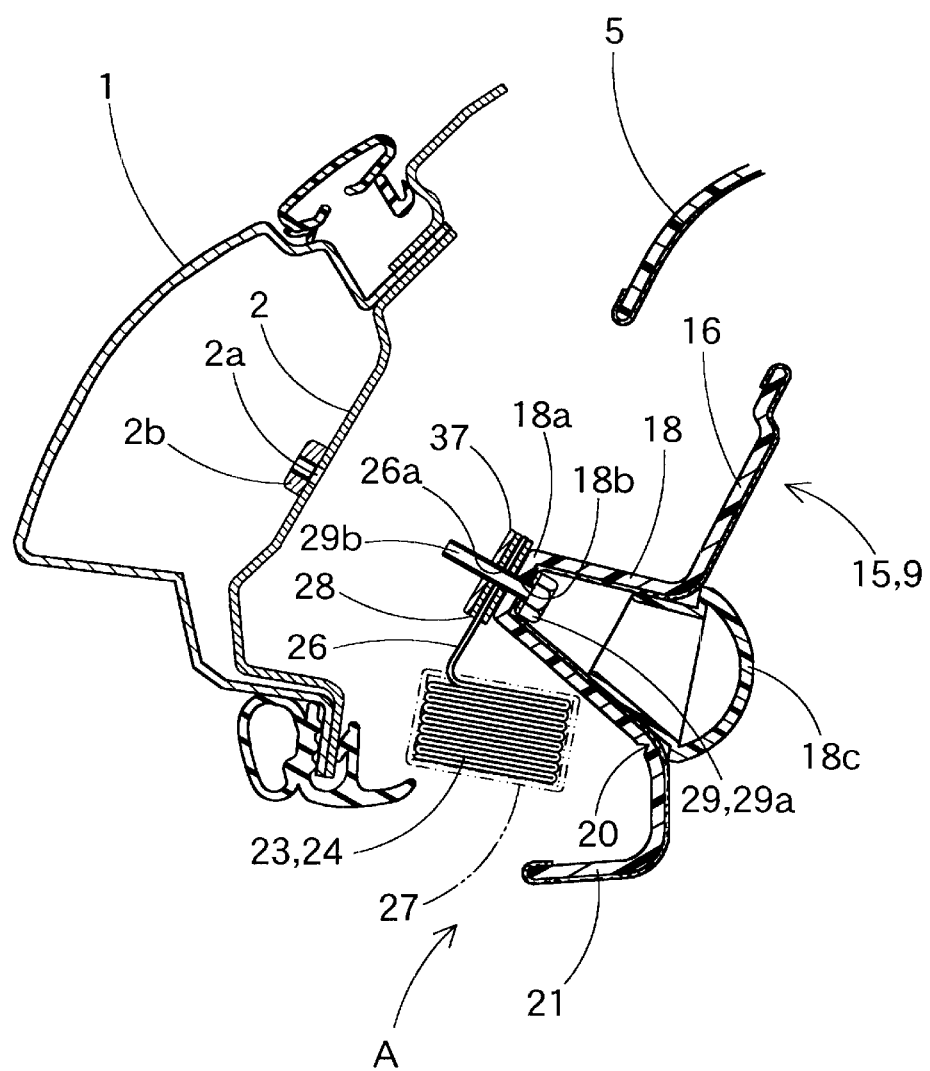
FIG. 6 is a sectional view of an air bag installation body in the first embodiment, which corresponds to a portion shown in FIG. 3.

As shown in FIG. 6, the air bag installation portion 26 is disposed in a location proximate to each installation portion 18 of the air bag cover 15 toward the exterior side of a vehicle O. The installation bracket 28 has been already fixed to the installation portion 26. Each installation bolt 29 passes through the installation holes 18b and 26a. Then, the spring plate nut 37 is fitted into a male screw portion 29b of each bolt 29. Further, the cap 18c is fitted into a socket location of the installation portion 18 on the interior side I of a vehicle.

In the above air bag installation body A, a periphery of the installation hole 12a of each installation portion 12 of the assist grip 11, the bottom wall portion 17a of the installation portion of the air bag cover 15, and the installation portion 33c of the bracket portion of the inflator 31 are gripped by a head 35a of the installation bolt 35 and the spring plate nut 37. Similarly, the bottom wall portion 18a of the installation portion of the air bag cover 15, and the installation portion 26 of the air bag, are also gripped by a head 29a of the installation bolt 29 and the spring plate nut 37. The assist grip 11, the air bag cover 15, the air bag 23, and the inflator 31 are formed into a unitary body.

In order to install the air bag installation body A in a vehicle, the caps 12b and 18c are detached first. Then, a male screw portion 35b of each installation bolt 35 is screwed in the nut 2b disposed in a location of each installation hole 2a of the inner panel 2. A male screw portion 29b of each installation bolt 29 is also screwed in the nut 2d disposed in a location of each installation hole 2c of the inner panel 2. After that, the cap 12b is fixed to each installation portion 12, while the cap 18c is fixed to each installation portion 18. As a result, the head protection air bag apparatus M1 can be mounted in a vehicle through the installation of the air bag installation body A in the roof side rail portion RR.

In mounting the air bag apparatus M1 in a vehicle, each inflator main body portion 32 is connected to an operation signal inputting line, which extends from an air bag controlling circuit and which is not shown in the drawings. Before or after the air bag apparatus M1 is installed, a front pillar garnish 4, a first and second middle pillar garnishes 7 and 8, and the roof head lining 5 of the front pillar portion FP, the first and second middle pillar portions P1 and P2, and the rear pillar portion RP are installed in a vehicle.

When each inflator 31 is activated after the head protection air bag apparatus M1 is installed in a vehicle, a gas for inflation is emitted from the gas emitting exit 32c of the inflator main body portion 32. The gas for inflation flows into each air bag main body portion 24 through the gas flow portion 25 so that each air bag main body 24 would inflate. Thus, each air bag main body portion 24 tears the tape material 27 as well as pushes the door portion 21 of the air bag cover 15 to open it. Each main body portion 24 is developed and inflated so as to cover the openings W1, W2 and W3.

At this time, three air bags 23 having small capacity cover respective openings W1, W2 and W3, respectively, in the head protection air bag apparatus M1 in the first embodiment. Thus, in the air bag apparatus M1, each air bag 23 can be developed and inflated quickly until it completely develops into a shape such that respective openings W1, W2 and W3 are covered. One or two air bags may be used, provided that the above is not taken into account. In this case, the inflator 31 is also arranged to be disposed in a predetermined location toward the exterior side of a vehicle of the assist grip 11. In the case of using two air bags, one of the air bags covers at least two of the openings W1, W2 and W3 while the other covers the remaining opening. In the case of using one air bag, the air bag covers all of the openings W1, W2 and W3.

In the head protection air bag apparatus M1 in the first embodiment, each inflator 31 is disposed in a location toward the exterior side of a vehicle O relative to the assist grip 11 to be fixed to the body 1. That is, each assist grip 11 functions as a cover material for the inflator 31. The assist grip itself is provided with the core material 11a made of a metal, while it is provided on its surface side with the cover layer 11b made of a soft synthetic resin such as soft vinyl chloride and urethane.

Therefore, a passenger will impact the assist grip, which has the characteristic of a cushion, in situation when the passenger would impact the inflator. As a result, the impact of the passenger is less injurious than an impact in situations when no assist grip is provided.

The assist grip 11 itself is, of course, a component mounted in the roof side rail portion RR of a vehicle. Thus, using the assist grip 11 as a cover material for the inflator 31 does not increase the number of components mounted in a vehicle.

Therefore, in the head protection air bag apparatus M1 in the first embodiment, the inflator 31 can be covered without increasing the number of components with the characteristic of a cushion even when the inflator 31 is disposed in the roof side rail portion RR.

In the first embodiment, the inflator 31 and the assist grip 11 use a common installation bolt 35, which passes through the installation holes 12a and is fixed to the inner panel 2 of the body 1. Accordingly, the numbers of components and installation processes required in installing the inflator 31 and the assist grip 11 in the body 1 is decreased.

Further, in the first embodiment, the installation bolt 35, passing through the installation holes 12a, 33d and 17a, is used together with the inflator 31 and the assist grip 11 so that the air bag cover 15 is also fixed to the body 1. Accordingly, the numbers of components and installation processes in installing the inflator 31, the assist grip 11 and the air bag cover 15 in the body 1 can be further decreased.

Moreover, in the first embodiment, the air bag apparatus M1 comprises the air bag installation body A. The air bag installation body A is formed by installing the assist grip 11, the air bag 23, the inflator 31 and the air bag cover 15 by means of the installation bolts 35 and 29 and the spring plate nut 37. The air bag installation body A can be installed to the inner panel 2 on a side of the body 1 as one body. That is, it is possible to install the air bag apparatus M1 in a vehicle only by installing the air bag installation body A having been formed into one body in a vehicle. Accordingly, the operation required for installing the air bag apparatus M1 in a vehicle is improved. After the air bag installation body A is formed into one body, the effort involved in handling the body, for example in transportation and control, are simplified.

Furthermore, in the first embodiment, the air bag cover 15 fills a space between the upper edge side of the openings W1, W2 and W3 and the roof head lining 5, on the interior side of a vehicle I of the roof side rail portion RR. That is, the air bag cover 15 can be provided as the roof side rail garnish 9. Thus, the air bag cover 15 would not decrease the decorative design characteristics of the interior side of a vehicle I.

Next, the head protection air bag apparatus M2 in the second embodiment shown in FIGS. 7 to 12 will be described. In this air bag apparatus M2, an air bag cover 15A is formed into one body on the lower edge side of the roof head lining 5.

In the air bag apparatus M2, a structure of an air bag 43, an inflator 51, an assist grip 11A (11A1, 11A2 and 11A3) and a portion of a part of the air bag cover 15A is somewhat different from the first embodiment. For example, the air bag cover 15A is formed into one body with the roof head lining 5.

Figure 7:
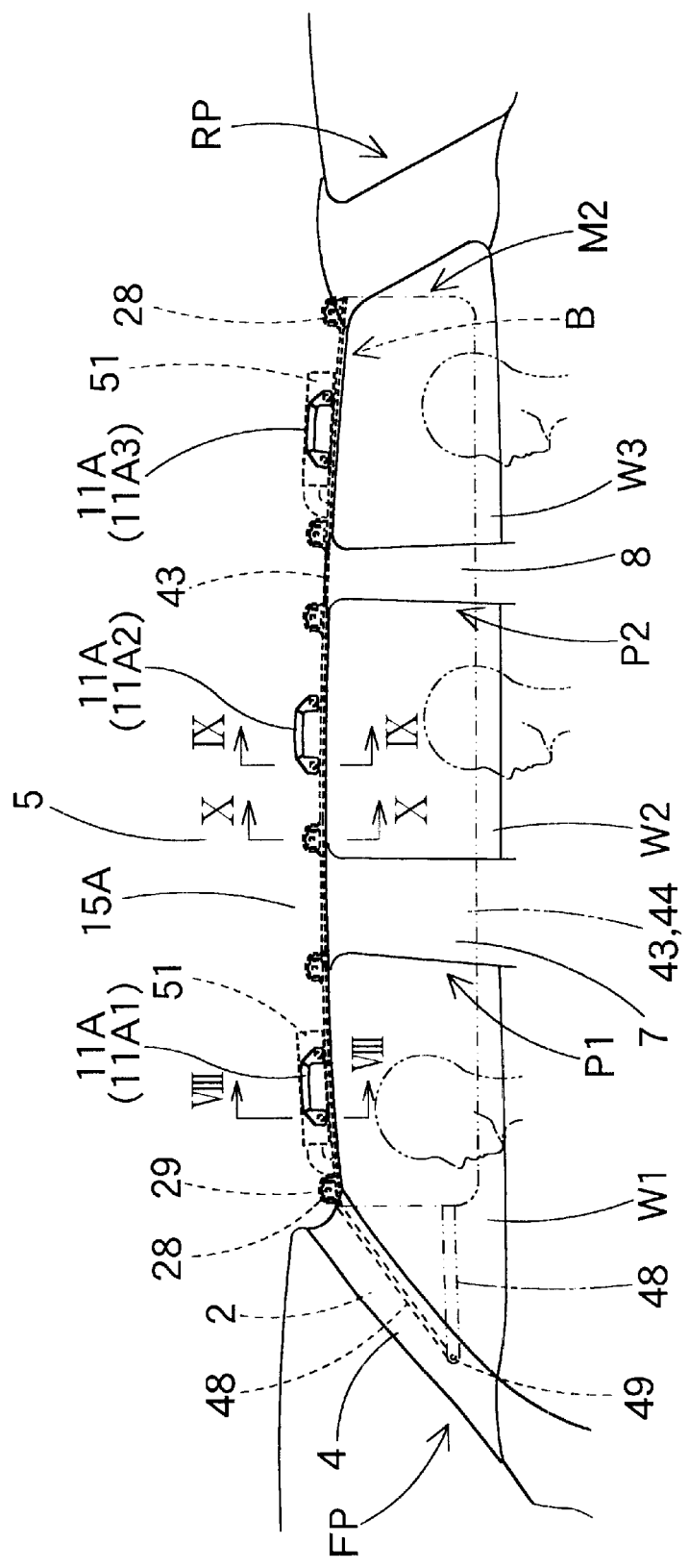
FIG. 7 is a front view of a head protection air bag apparatus in the second embodiment from the interior side of a vehicle.
Figure 10:
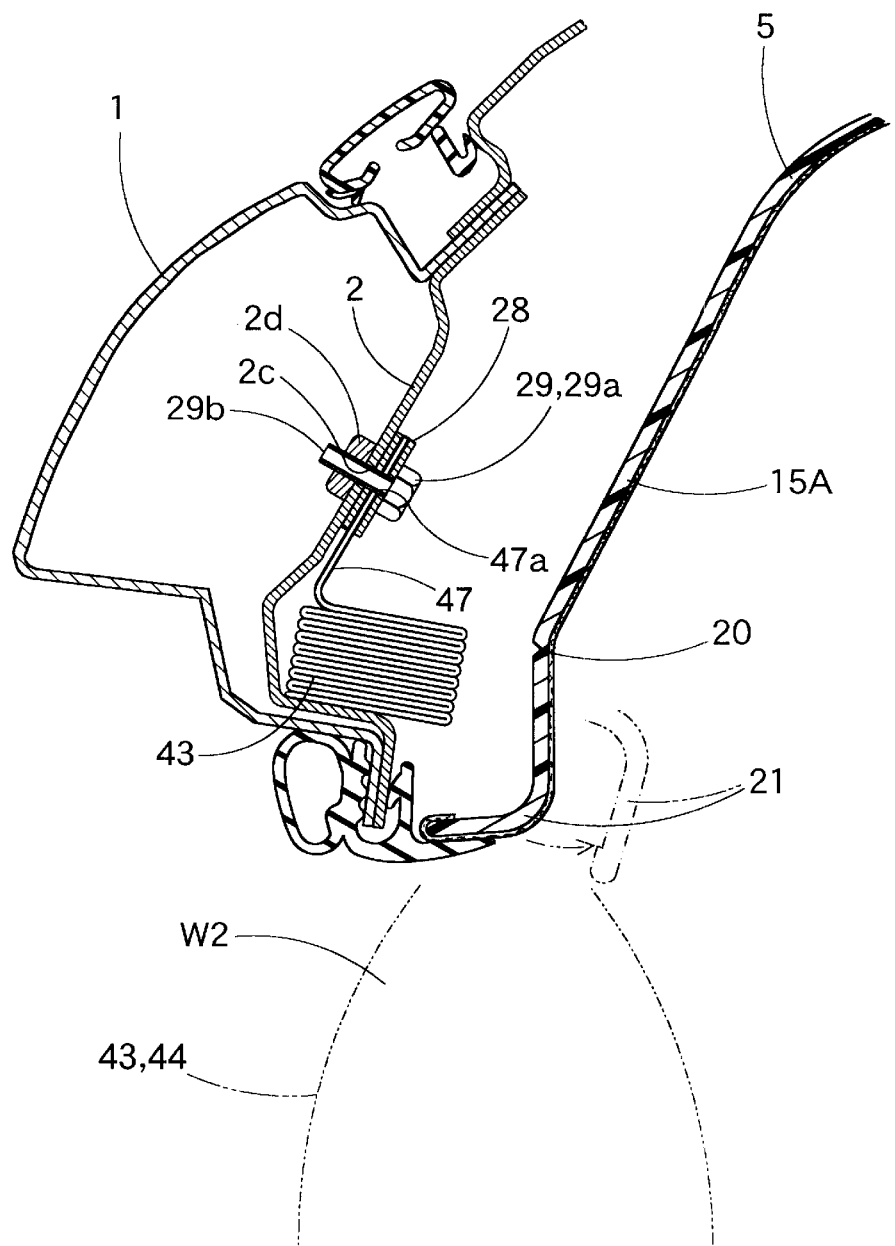
FIG. 10 is a sectional view of a portion X—X shown in FIG. 7.
Figure 11:
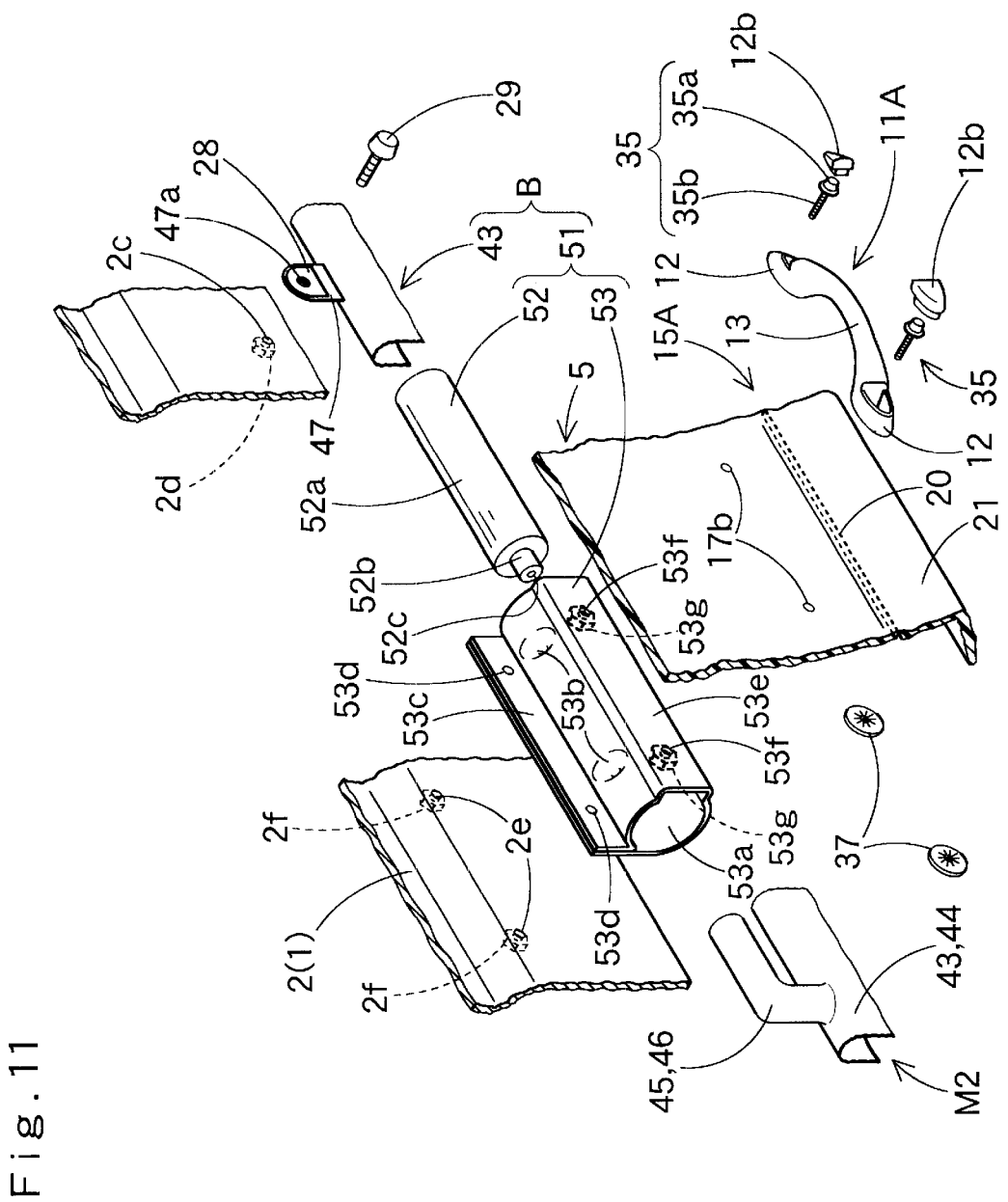
FIG. 11 is an exploded perspective view of the principal part in the second embodiment.
Figure 12:
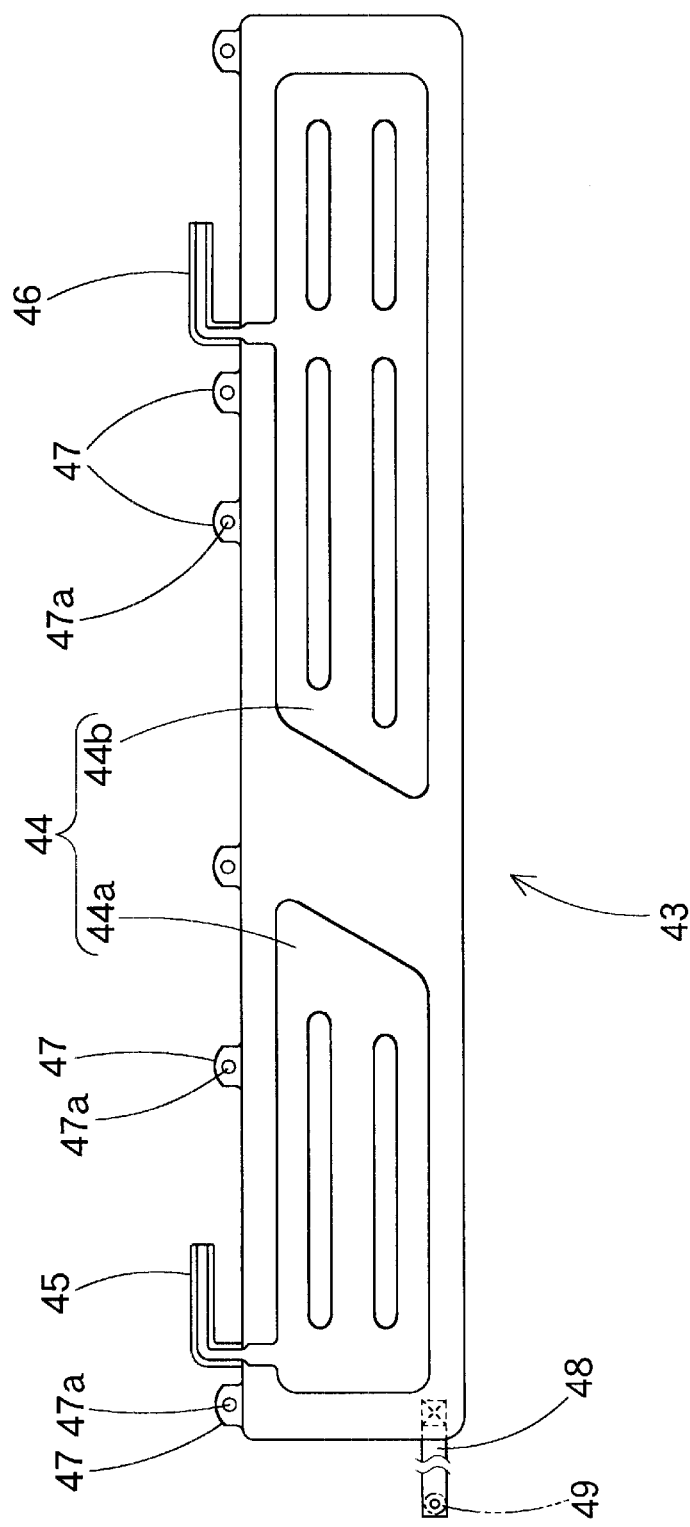
FIG. 12 shows a flat developed air bag in the second embodiment.

The air bag 43 is woven into a shape of a bag, as was the case in the first embodiment. A single air bag 43, however, is used to cover the interior side of a vehicle from a vicinity of the front pillar portion FP to the rear pillar portion RP, as shown in FIGS. 7 and 12. The air bag 43 comprises two gas flow portions 45 and 46, which are disposed in a vicinity of the front and rear ends on the upper edge side of the air bag 43. A main air bag body portion 44 comprises a front inflation portion 44a continuously connected to the gas flow portion 45 and a rear inflation portion 44b continuously connected to the gas flow portion 46. On the upper edge side of the main body portion 44, a plurality of installation portions 47 are provided with an installation hole 47a, as was the case of the air bag 23. An installation bracket 28 (see FIGS. 10 and 11) is fixed at each installation portion 47. A belt portion 48 is connected to the front side of the main body 44. The front end of the belt portion 48 is connected to the inner panel 2 of the front pillar portion FP by means of a bolt 49. The belt portion 48 projects from the lower edge side of the front pillar garnish 4 when the air bag develops and inflates. The belt portion 48 causes tension in the front-rear direction on the lower edge side of the air bag 43. When the tension is caused, movement of the air bag 43 to the exterior side of a vehicle O can be limited. Each installation portion 47 is installed in the inner panel 2 of the roof side rail portion RR separately from the air bag cover 15A by means of the installation bolt 29, as shown in FIGS. 10 and 11. This installation is different from the first embodiment. The installation bolt 29 is screwed in a nut 2d provided in a location of an installation hole 2c.

Figure 8:
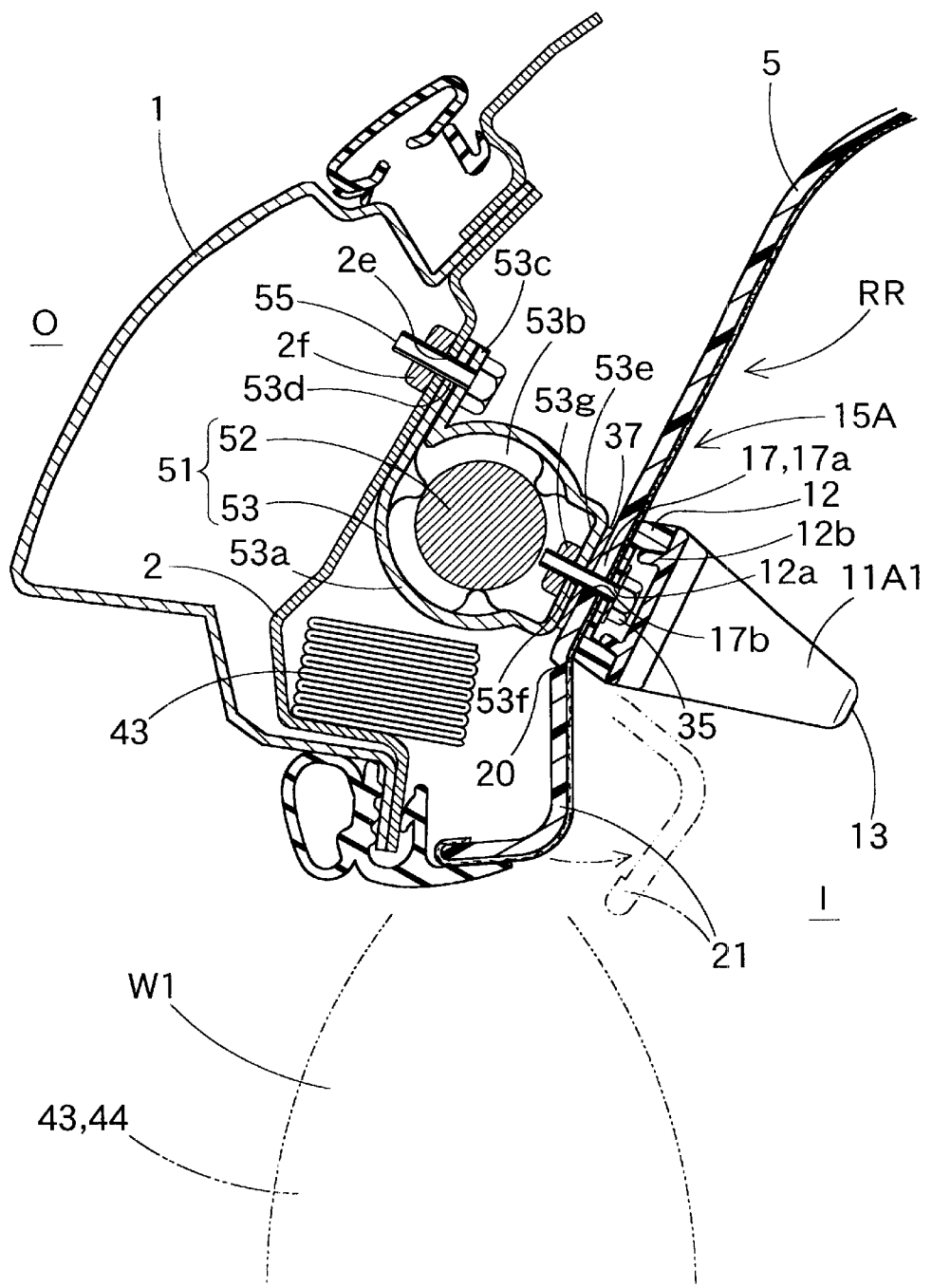
FIG. 8 is a sectional view of a portion VIII—VIII shown in FIG. 7.

The inflators 51 are disposed in two locations on the upper edge side of the periphery of respective openings W1 and W3, as shown in FIGS. 7, 8 and 11. Each inflator 51 is disposed toward the outer, or exterior side of a vehicle O, relative to the assist grips 11A1 and 11A3 so as to be hidden by the assist grips 11A1 and 11A3, respectively. In the case of the embodiment, each inflator 51 is disposed toward the outside of the vehicle O in roughly horizontal direction of the assist grips 11A1 and 11A3. Each inflator 51 comprises a cylindrical main body portion 52 for emitting a gas for inflation and a bracket portion 53. The main body portion 52 comprises a large diameter portion 52a and a small diameter portion 52b having a gas emitting exit 52c, as was the case of the inflator 31 in the first embodiment. The bracket portion 53 is made from a metal plate and is used to install the main body portion 52 to the inner panel 2 in the roof side rail portion RR.

The bracket portion 53 comprises a roughly cylindrical grip portion 53a, an installation portion 53c in a shape of a roughly oblong plate, and an installation portion 53e. The installation portion 53e is provided in a grip portion 53a. The grip portion 53a includes a plurality of pressing portions 53b that project to the inner circumference side of the grip portion. These pressing portions 53b reduce the inner diameter by plastic deformation to grip and hold the main body portion 52. The installation portion 53c extends upward from the grip portion 53a. The installation portion 53c is provided with installation holes 53d disposed in two places. An installation bolt 55 is used for installing the inflator 51 in the inner panel 2 on a side of a body 1. The installation bolt 55 passes through each installation hole 53d. Each installation bolt 55 is screwed in a nut 2f of the inner panel 2. The nut 2f is provided in a location of an installation hole 2e.

The installation portion 53e is provided for installing the assist grips 11A1 and 11A3 and the air bag cover 15A. The installing portion 53e is provided with installation holes 53f disposed in two places. In the location of each installation hole 53f, a fixed nut 53g, is provided for the installation bolt 35.

Figure 9:
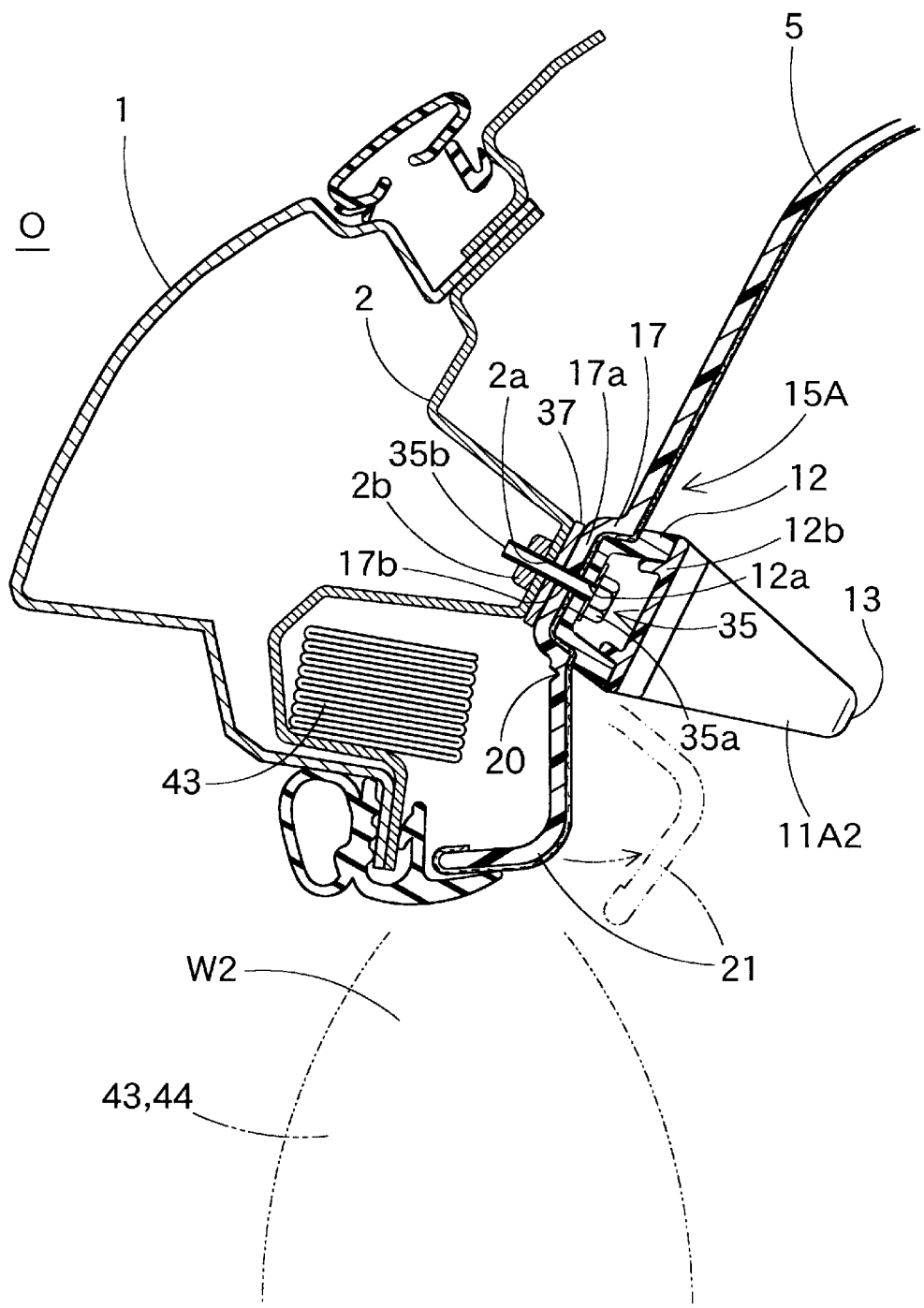
FIG. 9 is a sectional view of a portion IX—IX shown in FIG. 7.

The assist grip 11A is made of a soft synthetic resin such as soft vinyl chloride and urethane. The assist grip 11A comprises a center grip portion 13 and installation portions 12 disposed on the both ends of the grip portion 13. Each installation portion 12 is provided with an installation hole 12a through which the installation bolt 35 passes. In each installation portion 12, a fixed cap 12b is disposed for hiding a head of the bolt 35. The assist grip 11A is disposed on the interior side of a vehicle I in the roof side rail portion RR on the upper edge side of respective openings W1, W2 and W3, as was the case of the first embodiment, as shown in FIGS. 7 to 9. Each inflator 51 is disposed toward the outer, or exterior side of a vehicle O in a roughly horizontal direction of the assist grips 11A1 and 11A3 at the front and rear of the vehicle, respectively. The assist grips 11A1 and 11A3 are disposed on the upper edge side of the openings W1 and W3, and are installed in the inflator 51 by means of the bolt 35, as shown in FIGS. 7 and 8. The air bag cover 15A is disposed between the respective assist grips 11A1 and 11A3 and the inflator 51. The bolt 35 is screwed in the nut 53g of the installation hole 53f of the inflator installation portion 53e, after having passed through the installation holes 12a and 17b.

The assist grip 11A2 is disposed on the upper edge side of the opening W2, and is installed in the inner panel 2 by means of the bolt 35, as shown in FIGS. 7 and 9. The air bag cover 15A is disposed between the assist grip 11A2 and the inner panel 2. The bolt 35 used for installing the grip 11A2 is screwed in a nut 2b provided in the inner panel 2 in the roof side rail portion RR. The nut 2b is fixed in a location of an installation hole 2a.

In the air bag cover 15A formed into one body with the roof head lining 5, an installation portion 17 is provided in a location for disposing the installation portion 12 of each assist grip 11A, as was the case of the first embodiment. The installation portion 17 comprises an installation hole 17b through which the installation bolt 35 passing. The installation portion 18 in the first embodiment is not provided in a location for disposing each installation portion 47 of the air bag 43.

In order to mount the head protection air bag apparatus M2 in a vehicle, the air bag 43 is first folded in a shape of bellows as was the case of the first embodiment. Then, the air bag 43 is wrapped with a tape material, not shown in the drawings, and an installation bracket 28 is fixed in each installation portion 47. The respective gas flow portions 45 and 46 are connected to the small diameter portion 52b of the inflator 51 by means of a clamp not shown in the drawings. As a result, the air bag installation body B, comprising the air bag 43 and the inflator 51 (see FIG. 11), is formed.

Each installation bolt 55 is screwed in the nut 2f, which is in a location of the installation hole 2e of the inner panel 2, after having first passed through the installation hole 53d. At the same time, each installation bolt 29 is screwed in the nut 2d, which is in a location of the installation hole 2c of the inner panel 2, after having first passed through the installation hole 47a. Further, the top end of the belt 48 is fixed in the inner panel 2 in the front pillar portion FP by means of the bolt 49. As a result, the installation of the air bag 43 in the inner panel 2, is accomplished through the installation of the air bag installation body B in a vehicle.

After that, a roof head lining 5 that includes the air bag cover 15A is formed into one body, and a front pillar garnish 4 and a first and second middle pillar garnishes 7 and 8 of the front pillar portion FP, the first and second middle pillar portions P1 and P2, and the rear pillar portion RP are installed in a vehicle. Thus the air bag apparatus M2 is mounted in the vehicle.

Before installing the roof head lining 5 in a vehicle, each assist grip 11A is installed in the air bag cover 15A in advance by means of the bolt 35 and a spring plate nut 37. That is, a male screw portion 35b of the bolt 35 passes through the installation holes 12a and 17b of the respective installation portions 12 and 17 so that the nut 37 is fitted in each male screw portion 35b. At this time, a bolt head 35a and the nut 37 grip the installation portions 12 and 17 of each assist grip 11A and the air bag cover 15A. Thus, each assist grip 11A is installed in the air bag cover 15A.

In installing the roof head lining 5 in a vehicle, each bolt 35 is screwed in the nuts 53g and 2b, which are in locations of the installation holes 53f and 2a of the inflator installation portion 53e and the inner panel 2. A portion of the air bag cover 15A, which is not shown in the drawings, is fixed on a side of the body 1. As a result, the roof head lining 5, and the air bag cover 15A, are formed into one body which can be installed in a vehicle.

In mounting the air bag apparatus M2 in a vehicle, each inflator main body portion 52 is connected to an operation signal inputting line, which extends from an air bag controlling circuit and which is not shown in the drawings.

When each inflator 51 is activated after the head protection air bag apparatus M2 is mounted in a vehicle, a gas for inflation is emitted from a gas emitting exit 52c of the inflator main body portion 52. The gas for inflation flows into the front and rear inflation portions 44a and 44b of the air bag main body portion 44 through the gas flow portions 45 and 46. Thus, the air bag main body portion 44 inflates to tear a tape material not shown in the drawings as well as pushes a door portion 21 of the air bag cover 15A to open it, as was the case of the first embodiment. As a result, the air bag main body portion 44 is developed and inflated to cover the openings W1, W2 and W3.

In the head protection air bag apparatus M2 in the second embodiment, each inflator 51 is disposed in a location toward the exterior side of a vehicle O of the assist grips 11A1 and 11A3 to be fixed to the body 1. Thus, the respective assist grips 11A1 and 11A3 made of a soft synthetic resin such as soft vinyl chloride and urethane play a roll of a cover material for the inflator 51. As a result, the similar operation and effect to the first embodiment can be achieved also in the second embodiment.

Further, in the second embodiment, the decorative or functional design characteristics of the inner side of a vehicle I would not be decreased since the air bag cover 15A is formed into one body with the roof head lining 5.

In the first and second embodiments, the air bags 23 and 43, when developed and inflated, cover roughly all over the openings W1, W2 and W3. It is possible, however, that the developed and inflated air bags 23 and 43 are arranged not to cover all over the openings W1, W2 and W3. For example, the air bag may be provided so as to cover a part of the openings W1, W2 and W3 or a part of or all of the pillar portions P1, P2 and RP on the interior side of a vehicle.

The location for disposing the inflators 31 and 51 are not limited, as long as the inflators 31 and 51 are disposed in predetermined locations toward the exterior side of a vehicle O of the assist grip 11 and 11A. For example, the inflators 31 and 51 may be disposed toward the outer, or exterior side of a vehicle O of the assist grips 11 and 11A, which is in a location of the pillar portions FP, P1, P2 and RP, when the assist grips 11 and 11A are disposed in the pillar portions FP, P1, P2 and RP.

A condition of the locations of the inflators 31 and 51, disposed toward the outer, or exterior side of a vehicle O of the assist grips 11 and 11A, is that the inflators 31 and 51 do not interfere with a passenger under a condition that the air bag covers 15 and 15A only exist in between. Accordingly, the locations may be not only toward the exterior side of a vehicle O in a horizontal direction of the assist grips 11 and 11A, but also toward the exterior side of a vehicle O, a small distance above or below the assist grips 11 and 11A.

Figure 13:
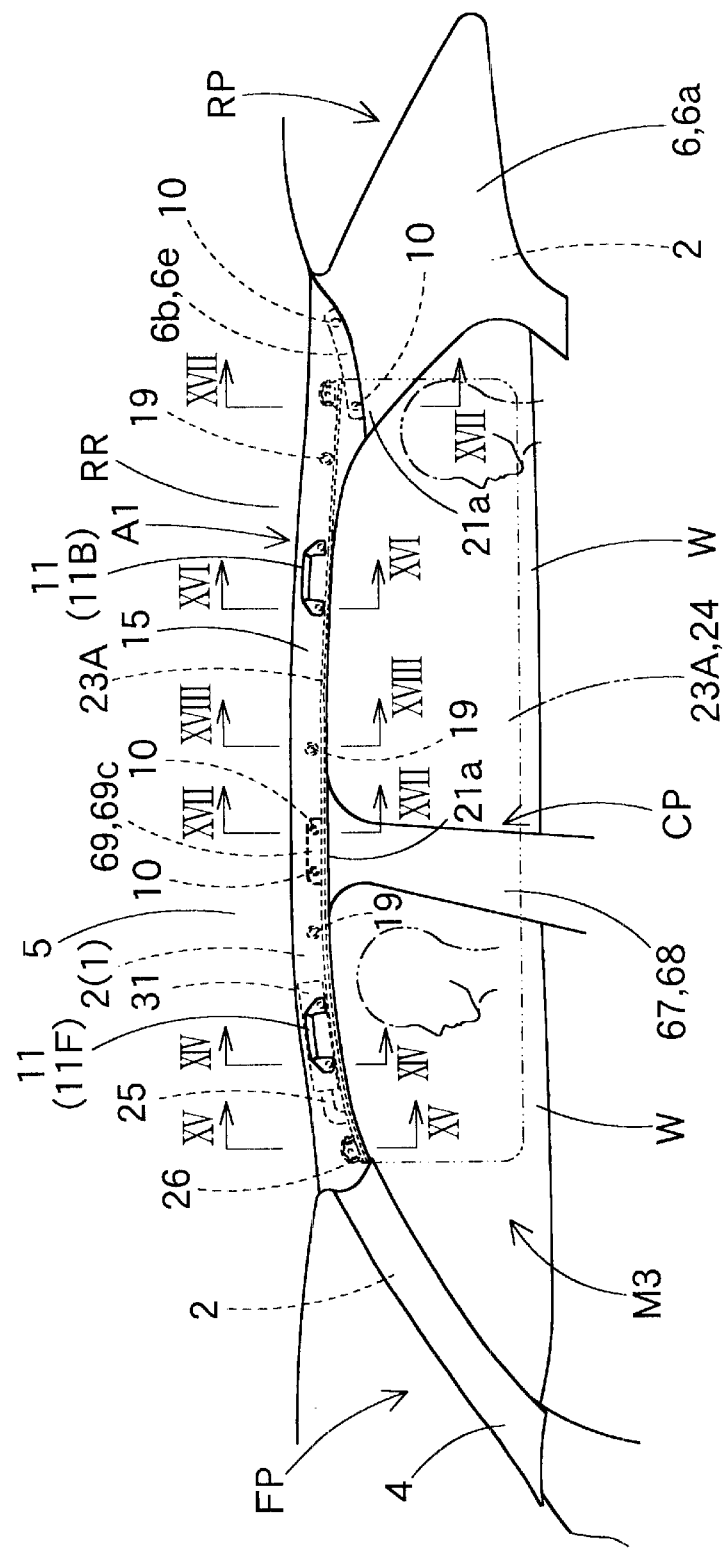
FIG. 13 is a front view of a head protection air bag apparatus in the third embodiment from the interior side of a vehicle.

In a head protection air bag apparatus M3 in the third embodiment shown in FIGS. 13 to 19, one folded air bag 23A is provided in the front-rear direction on the interior side of a vehicle, as shown in FIG. 13. Specifically, the air bag 23A is provided in a periphery on the upper edge side of an opening W of a door or a window portion on the interior side of a vehicle, that is, in a roof side rail portion RR from a front pillar portion FP through a center pillar portion CP, which is a middle pillar portion, to a vicinity of a rear pillar portion RP.

The head protection air bag apparatus M3 comprises the air bag 23A, an inflator 31, an installation bracket 28, an air bag cover 15 and an assist grip 11.

The head protection air bag apparatus M3 in the third embodiment is mounted in a vehicle in which the middle pillar portion comprises a line of the center pillar portion CP. The head protection air bag apparatus M3 comprises one air bag 23A and one inflator 31, and the air bag cover 15 is provided with an installation portion 19, as well as installation portions 17 and 18. Except for this difference, the third embodiment is arranged substantially the same as the first embodiment. Therefore, in the third embodiment, the same reference numbers are given to members and portions similar to those of the first embodiment so that description of the members and portions similar to those of the first embodiment can be omitted.

The air bag 23A is woven into a shape of a bag with a thread made of polyamide or polyester, for example, and comprises a main body portion 24, a plurality of installation portions 26 and a gas flow portion 25, as shown in FIGS. 13 to 16 and 19. The main body 24 is in a roughly oblong board shape and inflates when a gas for inflation flows into from the inflator 31. Each installation portion 26 is provided with an installation hole 26a and disposed on the upper edge side of the main body 24. The gas flow portion 25 is roughly cylindrical and disposed in the upper part on the front portion side of the main body portion 24. Each installation portion 26 is provided with an installation bracket 28 made from a metal plate, as shown in FIGS. 14 to 16 and 19. Each installation portion 26 is installed in an inner panel 2 on a side of a body 1 in a roof side rail portion RP together with an installation bracket 28 by means of installation bolts 29 and 35.

The installation bolt 29 is used for fastening the air bag installation portion 26 and the installation portion 18 of the air bag cover 15 together to the inner panel 2 as was the case of the first embodiment. The bolt 35 is also used for fastening the air bag installation portion 26, the installation portion 17 of the air bag cover 15 and an installation portion 12 of the assist grip 11 together to the inner panel 2 as was the case of the first embodiment. The inner panel 2 is provided with nuts 2b and 2d for screwing the bolts 29 and 35 as was the case of the first embodiment. The nuts 2b and 2d are provided at locations of installation holes 2a and 2c.

Figure 14:
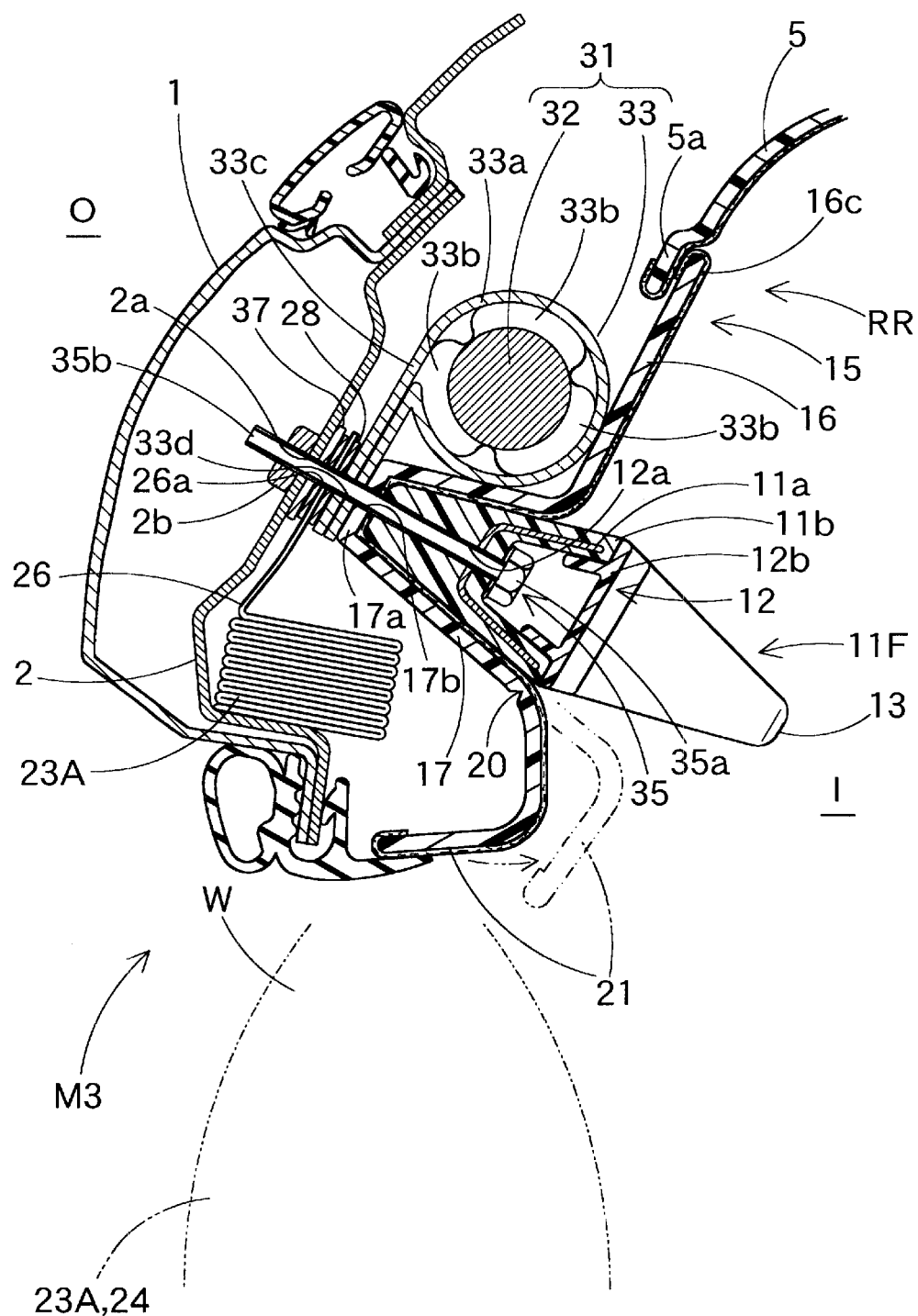
FIG. 14 is a sectional view of a portion XIV—XIV shown in FIG. 13.
Figure 15:
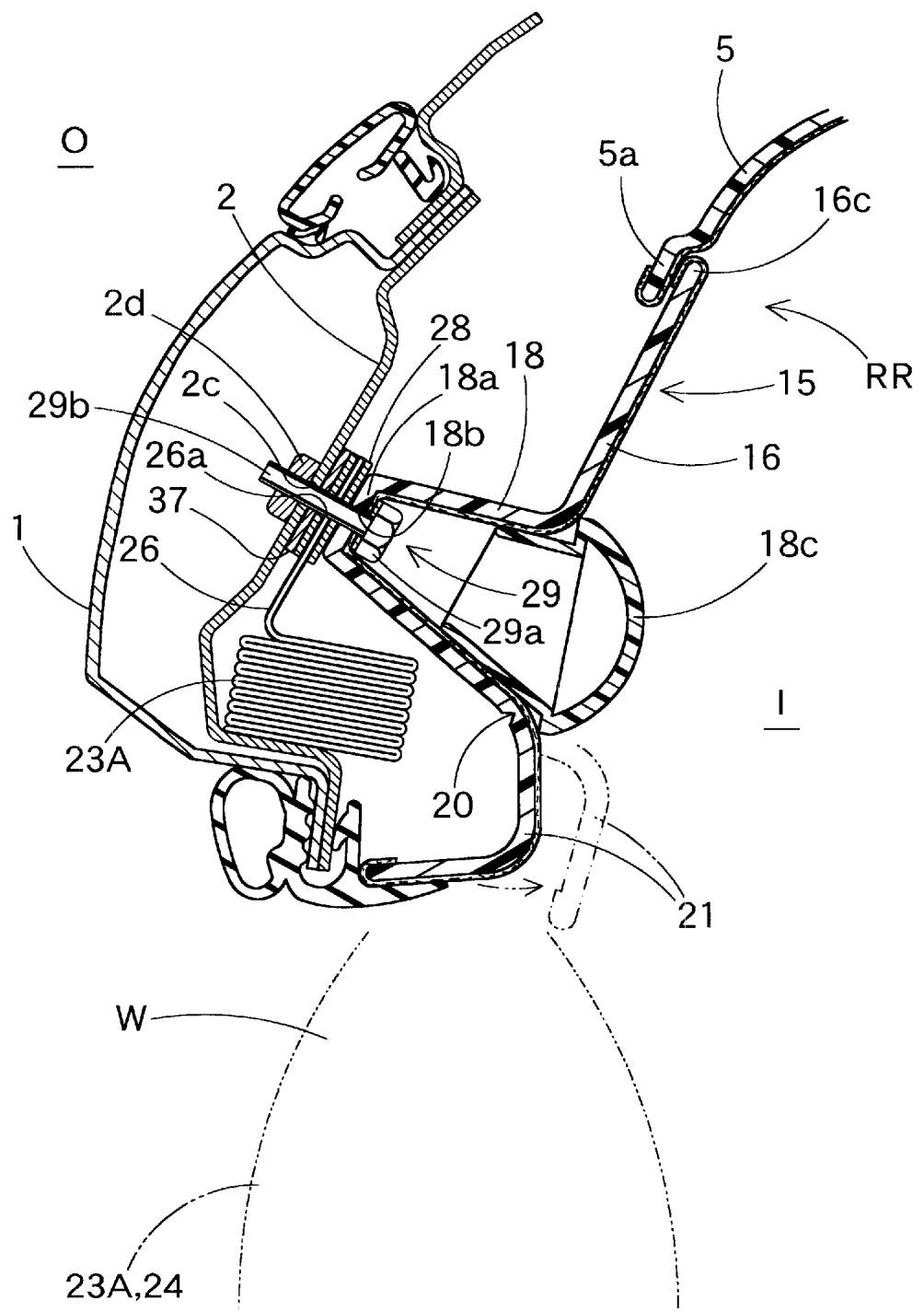
FIG. 15 is a sectional view of a portion XV—XV shown in FIG. 13.
Figure 16:
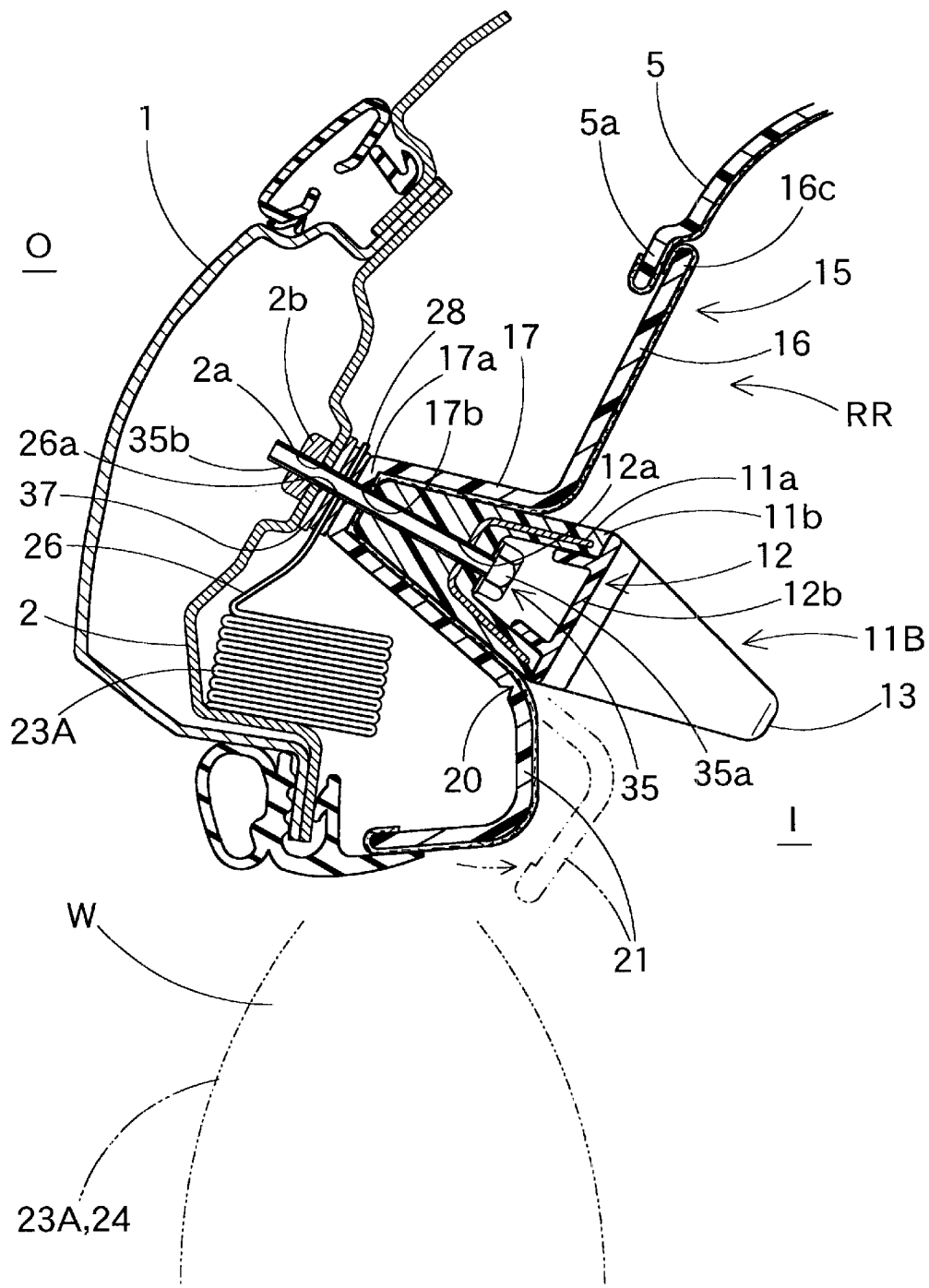
FIG. 16 is a sectional view of a portion XVI—XVI shown in FIG. 13.
Figure 19:
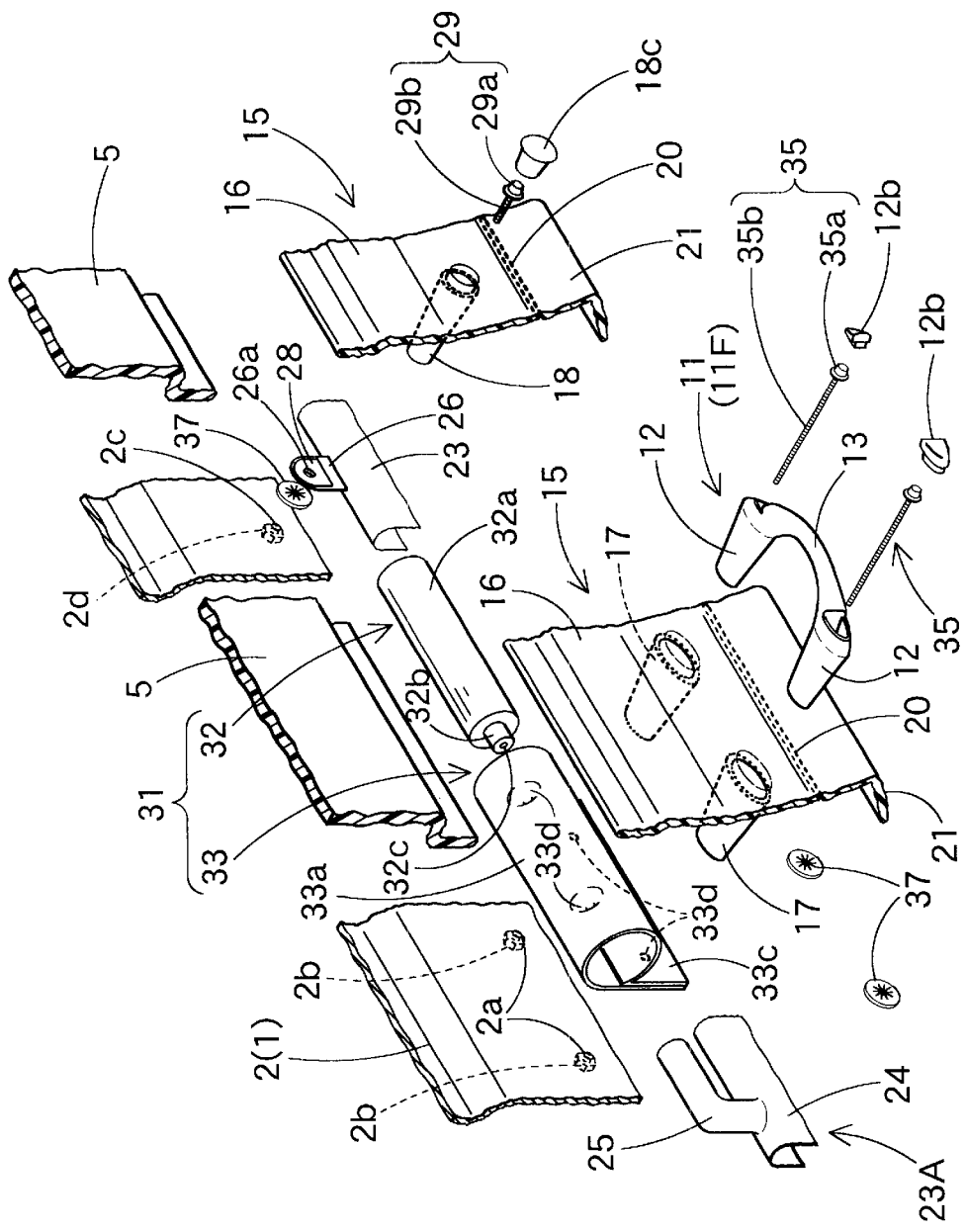
FIG. 19 is an exploded perspective view of the principal part in the third embodiment.

The inflator 31 is disposed in the upper part on the front portion side of the air bag 23A, as shown in FIGS. 13, 14 and 19. The inflator 31 is disposed toward the outer, or exterior side of a vehicle O in an obliquely upper direction of the assist grip 11F so as to be hidden by the assist grip 11 (11F) on the front side. The inflator 31 comprises a cylindrical main body portion 32 and a bracket portion 33 made from a metal plate as was the case of the first embodiment. The main body portion 42 comprises a large diameter portion 32a and a small diameter portion 32b having a gas emitting exit 32c. The bracket portion 33 comprises a grip portion 33a having a pressing portion 33b for gripping the main body 42 and an installation portion 33c. The installation portion 33c is provided in two locations with installation holes 33d through which the installation bolt 35 passing.

The gas flow portion 25 of the air bag 23A is connected to the small diameter portion 24c of the inflator main body portion 24 by means of a clamp not shown in the drawings.

The assist grip 11 (11F and 11B) is provided between the pillar portions FP, CP and RP on the upper edge side of an opening W, as shown in FIGS. 13, 14, 16 and 19. The assist grip 11 comprises a grip portion 13 for gripping by a passenger and an installation portion 12. The installation portion 12 is disposed on the both ends in the front-rear direction of the grip portion 13. Each assist grip 11 comprises a core material 11 made from a metal plate for maintaining the shape and a cover layer llb made of a soft synthetic resin as was the case of the first embodiment.

Each installation portion 12 comprises an installation hole 12a through which the installation bolt 35 passes. Each installation portion 12 is fitted into a location on the interior side of a vehicle of each installation portion 17 of the air bag cover 15. In a periphery of each installation hole 12a on the interior side of a vehicle, a cap 12b is fixed for hiding the bolt 35.

The air bag cover 15 is disposed longitudinally in the front-rear direction in the roof side rail portion RR from the front pillar portion PF through the center pillar portion CP to the rear pillar portion RP, as shown in FIGS. 13 to 19. That is, the air bag cover 15 is disposed as a roof side rail garnish between the lower edge of a roof head lining 5 and the upper edge side of an opening W as was the case of the first embodiment. The air bag cover 15 is preferably made of a synthetic resin and comprises a door portion 21 opened by push by the developed and inflated air bag 23A and a general portion 16 on the upper side of the door portion 21. On the upper edge side of the door portion 21 at a border location between the door portion 21 and the general portion 16, a thin hinge portion 20 is formed so that the door portion 21 opens smoothly. Three kinds of installation portions 17, 18 and 19, are projected toward the exterior side of a vehicle O, are formed in the general portion 16.

The installation portions 17 and 18 are formed in a roughly cylindrical shape projecting toward the exterior side of a vehicle O as described in the first embodiment. The installation portions 17 and 18 comprise installation holes 17b and 18b in bottom wall portions 17a and 18a on a side of a projected end surface. The installation portion 17 is fastened (fixed) in the inner panel 2 together with an installation portion 12 at the both ends in the front-rear direction of the assist grips 11F and 11B and the bracket portion 33 of the inflator 31. The installation portion 18 is fastened (fixed) in the inner panel 2 together with the installation portion 26 of the air bag 23A. Between the installation portion 17 for disposing the installation portion 12 of the assist grip 11F on the front side and the inner panel 2, there is the installing portion 33c of the inflator bracket portion 33, as shown in FIG. 14. On the other hand, between the installation portion 17 for disposing the installation portion 12 of the assist grip 11B on the rear side and the inner panel 2, there is no inflator bracket portion 33. In a location on the interior side of a vehicle of each installation portion 18, fixed a cap 18c for hiding the bolt 29.

The installation portion 19 comprises a lock shaft 19a and a lock cap 19d. The lock shaft 19a is made of metal and disposed in a location toward the exterior side of a vehicle of the air bag cover 15. The lock cap 19d is made of rubber or a soft synthetic resin and is locked to the lock shaft 19a. The lock shaft 19a comprises a neck portion 19c and a head portion 19b. The head portion 19b is expanded in a radius direction at the top end of the neck portion 19c. The lock cap 19d is in a roughly cylindrical shape capable of locking to the head portion 19b and comprises a lock portion 19e, lock groove 19f and convex groove 19g. The lock portion 19e is formed with an increased thickness and is disposed on the top end side of the cap 19d. The lock groove 19f is disposed in an outer circumference on a base portion side of the lock portion 19e. The concave groove 19g is disposed in an outer circumference on a base portion side of the cap 19d. In the installation portion 19, the lock cap 19d is mounted outside of the lock shaft 19a in advance. The installation portion 19 is first inserted into an installation hole 2h provided in the inner panel 2 to a location of the lock groove 19f. Then, the lock portion 19e of the lock cap 19d is locked to a periphery of the exterior side of a vehicle O of the installation hole 2h, so that the installation portion 19 can be installed in the inner panel 2. In this installation condition, the air bag cover 15 would move to the interior side of a vehicle I for a distance corresponding to elastic deformation of the lock portion 19e when the air bag cover 15 is strongly pulled to the interior side of the vehicle. However, the head portion 19b of the lock shaft 19a and the lock portion 19e of the cap 19d are not dropped off from the installation hole 2h. As a result, the installation portion 19 is firmly installed in the inner panel 2.

In the case of detaching the installation portion 19 from the inner panel 2 for maintenance or the like, the installation portion 19 should be first pushed into the exterior side of a vehicle O. At this time, the installation portion 19 is pushed until the convex groove 19g of the lock cap 19d is disposed in a location of the inner circumference surface of the installation hole 2h. A size of the inner diameter of the lock cap 19d is set in advance so that the head portion 19b of the lock shaft 19a can be pulled out from the lock cap 19d when the lock portion 19e is widened. Thus, the lock shaft 19a can be pulled out from the lock cap 19d and the installation hole 2h under a condition that the lock cap 19d is locked to a periphery of the installation hole 2h. As a result, the air bag cover 15 can be detached from the inner panel 2.

Figure 17:
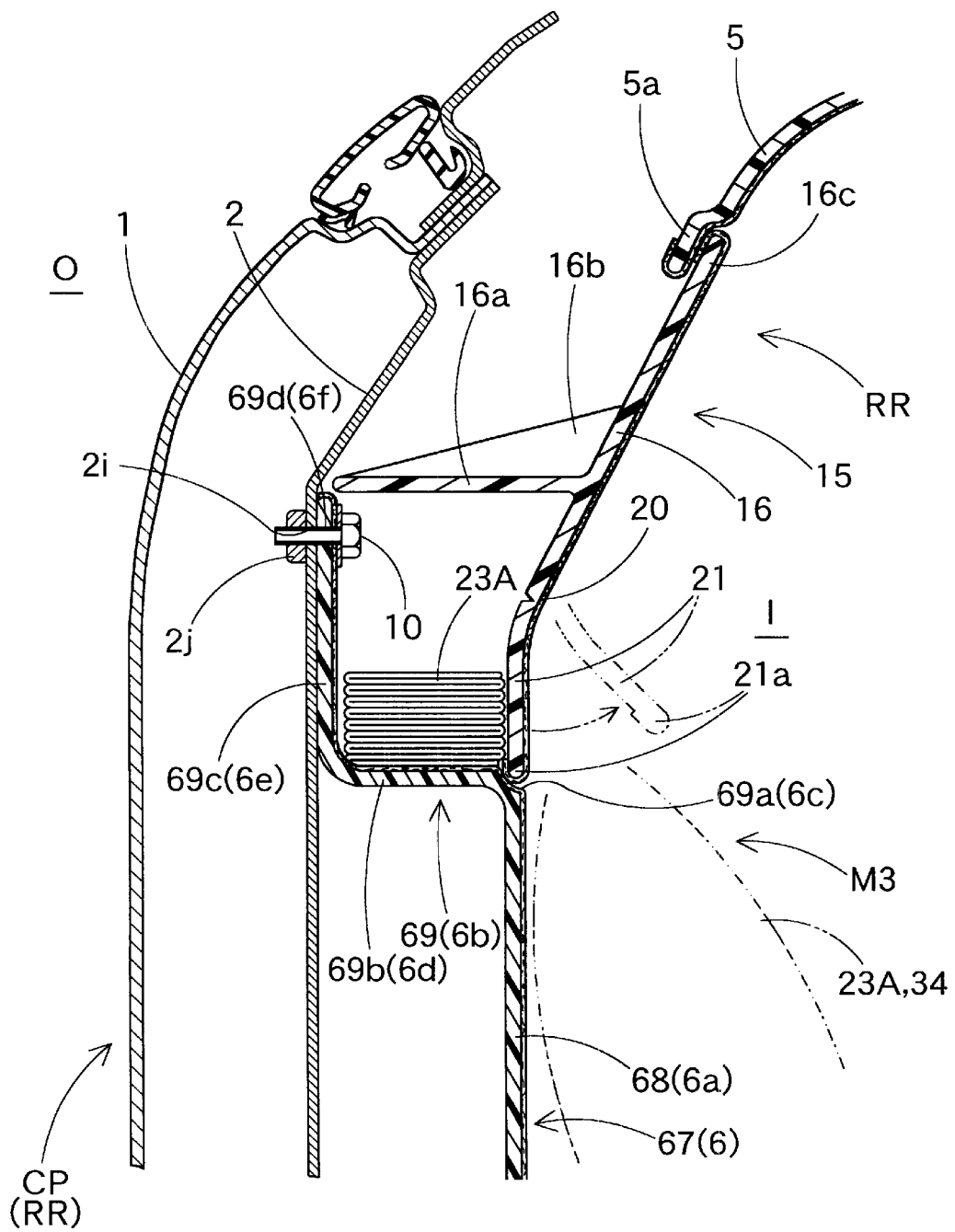
FIG. 17 is a sectional view of a portion XVII—XVII shown in FIG. 13.
Figure 18:
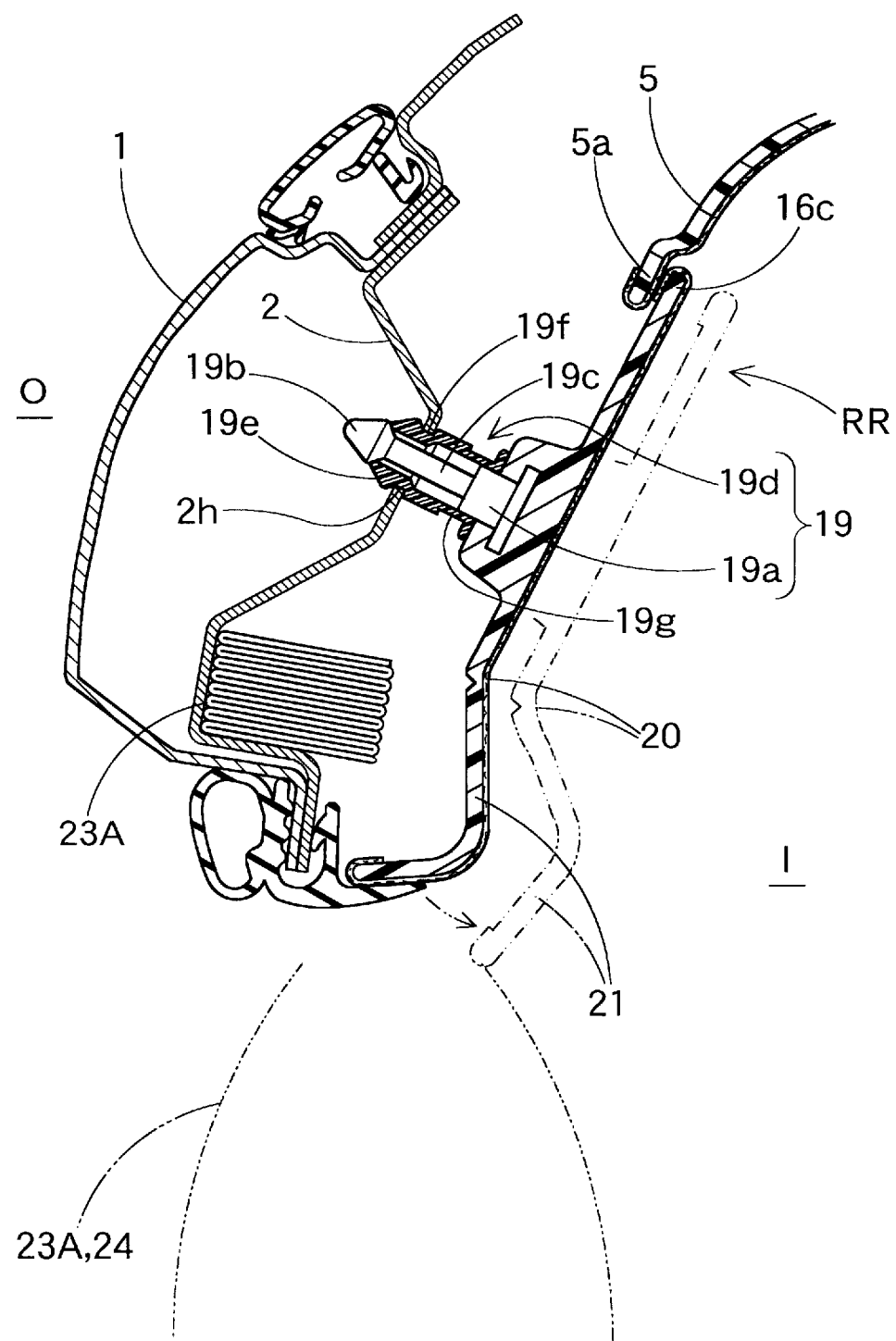
FIG. 18 is a sectional view of a portion XVIII—XVIII shown in FIG. 13.

In an upper location of the center pillar portion CP of the general portion 16 of the air bag 15, a lateral wall portion 16a is formed in a location on the exterior side of a vehicle O in an upper direction of the hinge portion 20, as shown in FIG. 17. The lateral wall portion 16a is reinforced by a rib 16b. The lateral wall portion 16a fills a space between the inner panel 2 above the folded air bag 23A and the air bag cover 15.

The center pillar portion CP is provided with a center pillar garnish 67 covering the interior side of the pillar portion CP of a vehicle I.

The lower edge of the air bag cover 15, that is, a lower edge portion 21a of the door portion 21 is disposed closer to the interior side of a vehicle I than an upper edge portion 69 of the center pillar garnish 67, in a location of the center pillar portion CP. The lower edge portion 21a is disposed within the convex recess 69a so that the lower edge portion 21a abuts and overlaps a general portion 68 of the center pillar garnish 67, so as to be in a same plane with the general portion 68. An upper edge portion 16c of the air bag cover 15 is also disposed on the interior side of a vehicle I of the lower edge portion 5a, which includes an offset portion that curves towards the exterior side of a vehicle O of the roof head lining 5. The upper edge portion 16c also abuts the roof head lining 5 so as to be in the same plane as the roof head lining 5.

The center pillar garnish 67 comprises the general portion 68 and the upper edge portion 69, as shown in FIGS. 17 and 19. The general portion 68 covers the interior side of a vehicle I of the center pillar portion CP. The upper edge portion 69 is disposed on an upper end side of the general portion 68. The upper edge portion 69 comprises a lateral wall portion 69b and an installation portion 69c. The lateral wall portion 69b extends toward the exterior side of a vehicle O from the upper end of the general portion 68 to be in contact with the inner panel 2. The lateral wall portion provides a support surface for the folded air bag 23a. The installation portion 69c extends upward from the top end of the lateral wall portion 69b along the inner panel 2. On a crossing portion of the lateral wall portion 69b and the general portion 68, provided a convex portion 69a for receiving the top end (lower end) of the upper edge portion 21a of the air bag cover door portion 21. The installation portion 69c is provided with an installation hole 69d in a vicinity of both edges of a vehicle in a front-rear direction. An installation bolt 10 passes through each installation hole 69d. The installation bolt 10 is used for fixing the center pillar garnish 67 in the inner panel 2 on a side of the body 1. The inner panel 2 comprises an installation hole 2i so that a nut 2j would be provided for screwing the installation bolt 10 in a location of an installation hole 2i.

On the rear pillar portion PR, provided also a rear pillar garnish 6 for covering the interior side of a vehicle I of the pillar portion RP. The lower end of the lower edge portion 21a of the air gag cover door portion 21 is disposed on the interior side of a vehicle I from an upper edge portion 6b of the rear pillar garnish 6 as was the case of the center pillar portion CP (see reference numbers in a bracket shown in FIG. 17). The lower end of the lower edge portion 21a is connected to a general portion 6a of the rear pillar garnish 6 so as to be in a same plane with the general portion 6a. The rear pillar garnish 6 also comprises the general portion 6a and the upper edge portion 6b. The general portion 6a covers the interior side of a vehicle I of the rear pillar portion RP. The upper edge portion 6b is disposed on the upper end side of the general portion 6a. The upper edge portion 6b comprises a lateral wall portion 6d and an installation portion 6e. The lateral wall portion 6d extends to the exterior side of a vehicle O from the upper end of the general portion 6a to be in contact with the inner panel 2. The installation portion 6e extends from the top end of the lateral wall portion 6d along the inner panel 2. At the location where the lateral wall portion 6d and the general portion 6a are attached, a convex portion 6c is formed for receiving the lower end of the lower edge portion 21a of the air bag cover door portion 21. The installation portion 6e is provided with an installation hole 6f. An installation bolt 10 for fixing the rear pillar garnish 6 in the inner panel 2 passes through the installation hole 6f.

Next, it will be described to mount the head protection air bag apparatus M3 in the third embodiment in a vehicle. First, an air bag installation body A1 is formed. In forming this installation body A1, an air bag 23A is folded first. In folding the air bag 23A, the air bag 23A is developed flat under a deflated condition. Then, the air bag 23A is folded in a shape of bellows with convex and concave folding lines so that the lower edge side of the main body portion 24 would be adjacent to the upper edge side thereof. After the air bag 23A is folded, a tape material 27, which is capable of being torn and which is for preventing the air bag 23A from loosing its folded shape, (see FIGS. 20 to 22) is wrapped at a predetermined interval. After the air bag 23A is folded, the installation bracket 28 is also installed in each installation portion 26.

The gas flow portion 25 is not folded. Then, the small diameter portion 32b of an inflator main body portion 32 uses a clamp not shown in the drawings to connect to the gas flow portion 25. The inner diameter of the inflator grip portion 33a is shortened so that the bracket portion 33 holds the main body portion 32.

Figure 20:
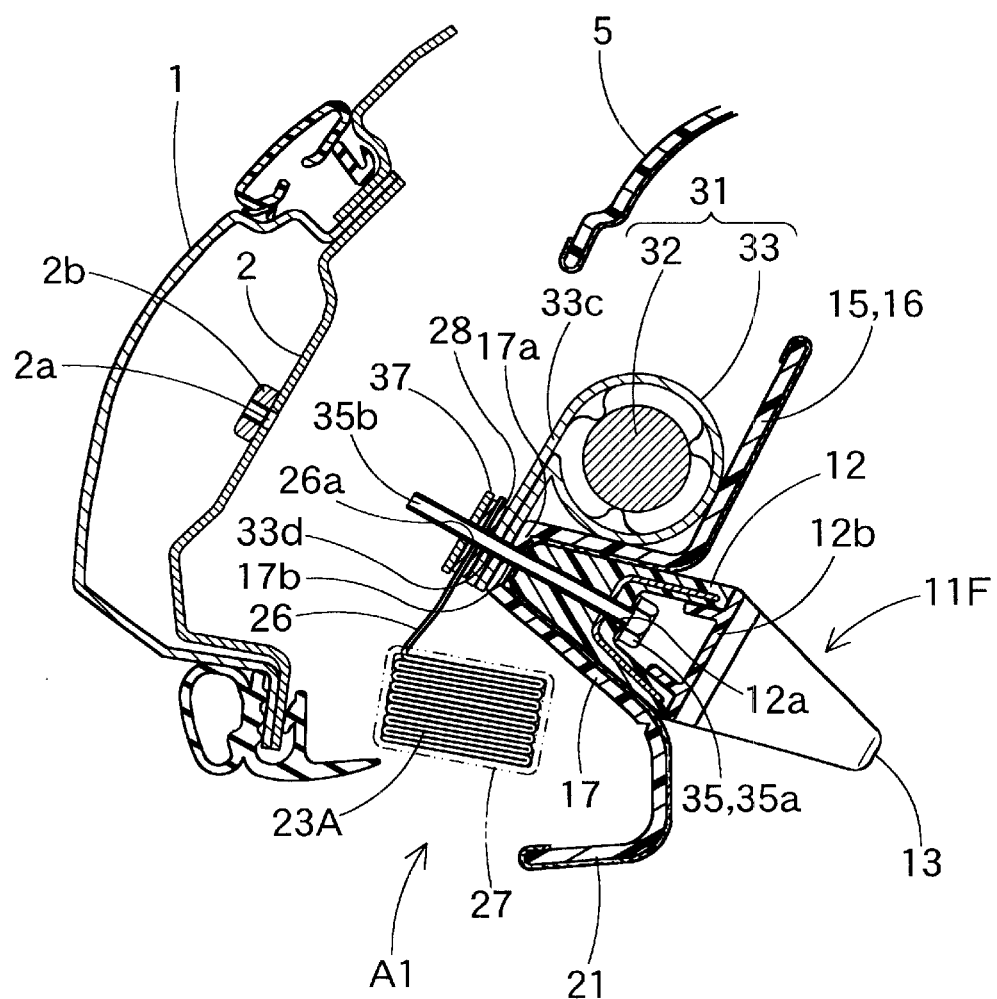
FIG. 20 is a sectional view of an air bag installation body in the third embodiment, which corresponds to a portion shown in FIG. 14.

The predetermined installation portion 26 for the inflator bracket portion 33 and the air bag 23A is disposed in a location proximate to each installation portion 17 of the air bag cover 15 on the exterior side of a vehicle O, as shown in FIG. 20. The installation portion 12 of the assist grip 11 is fitted into a location of each installation portion 17 on the interior side of a vehicle I, and then, each installation bolt 35 passes through the installation holes 12a, 17b, 26a and 33d. After that, a washer-shaped spring plate nut 37 is fitted into a male screw portion 35b of each bolt 35, and further, the cap 12b is fitted into a periphery on the interior side of a vehicle of the installation hole 12a. The spring plate nut 37 is formed from a thin spring plate as described above. The nut 37 can be easily fitted into the male screw portion 35b so that the nut 37 would be unable to drop off therefrom.

In an assist grip 11B in the above embodiment, the predetermined installation portion 26 of the air bag 23A is disposed in a location on the exterior side of a vehicle O of each installation portion 17 of the air bag cover 15 under a condition that there is no inflator bracket portion 33. The installation portion 12 of the assist grip 11B is fitted into a location on the interior side of a vehicle I of each installation portion 17, so that each installation bolt 35 passes through the installation holes 12a, 17b and 26a. Then, a washer-shaped spring plate nut 37 is fitted into a male screw portion 35b of each bolt 35, and further, the cap 12b is fitted into a periphery on the interior side of a vehicle of the installation hole 12a.

Figure 21:
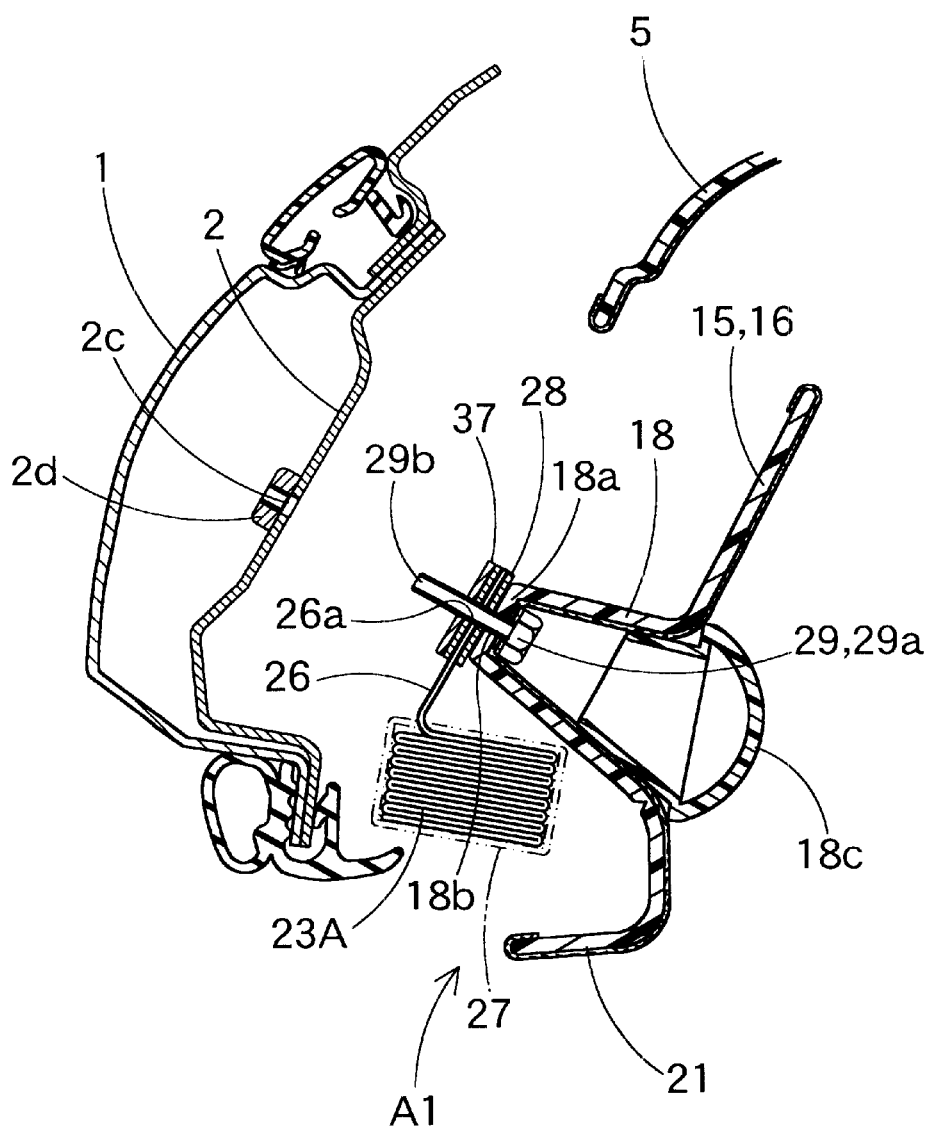
FIG. 21 is a sectional view of an air bag installation body in the third embodiment, which corresponds to a portion shown in FIG. 15.

As shown in FIG. 21, the air bag installation portion 26 is disposed in a location on the exterior side of a vehicle O of each installation portion 18 of the air bag cover 15. On each installation portion 26, the installation bracket 28 has been fixed in advance. Each installation bolt 29 passes through the installation holes 18b and 26a and the spring plate nut 37 is fitted into a male screw portion 29b of each bolt 29. Further, the cap 18c is fitted into a location of the installation portion 18 on the interior side of a vehicle I. As a result, the air bag installation body A1 is formed.

In the above air bag installation body A1, a head 35a of the installation bolt 35 and the spring plate nut 37 grip a periphery of the installation hole 12a of each installation portion 12 of the assist grip 11, the bottom wall portions 17a of the installation portion of the air bag cover 15, the installation portion 33c of the bracket portion of the inflator 31, and the air bag installation portion 26. A head 35a of the installation bolt 35 and the spring plate nut 37 grip a periphery of the installation portion 12a of each installation portion 12 of the assist grip 11B, the bottom wall portions 17a of the installation portion of the air bag cover 15 and the air bag installation portion 26. Further, a head 29a of the installation bolt 29 and the spring plate nut 37 grip the bottom wall portions 18a of the installation portion of the air bag cover 15 and the air bag installation portion 26. Thus, in the above air bag installation body A1, the assist grips 11F and 11B, the air bag cover 15, the air bag 23A, and the inflator 31 are installed each other to be formed into one body.

In order to install the air bag installation body A1 in a vehicle, the caps 12b and 18c are detached first. Then, a male screw portion 35b of each installation bolt 35 is screwed in the nut 2b, which is in a location of each installation hole 2a of the inner panel 2. A male screw portion 29b of each installation bolt 29 is also screwed in the nut 2d disposed at a location of each installation hole 2c of the inner panel 2, and at the same time, each installation portion 19 is inserted into an installation hole 2h of the inner panel 2 so as to lock to the periphery of the installation hole 2h. Further, the cap 12b is fixed in a location on the interior side of a vehicle of each installation portion 12, and the cap 18c is fixed in a location on the interior side of a vehicle of each installation portion 18. As a result, the air bag installation body A1 can be installed in the roof side rail portion RR, so that the head protection air bag apparatus M3 can be mounted in a vehicle.

Figure 22:
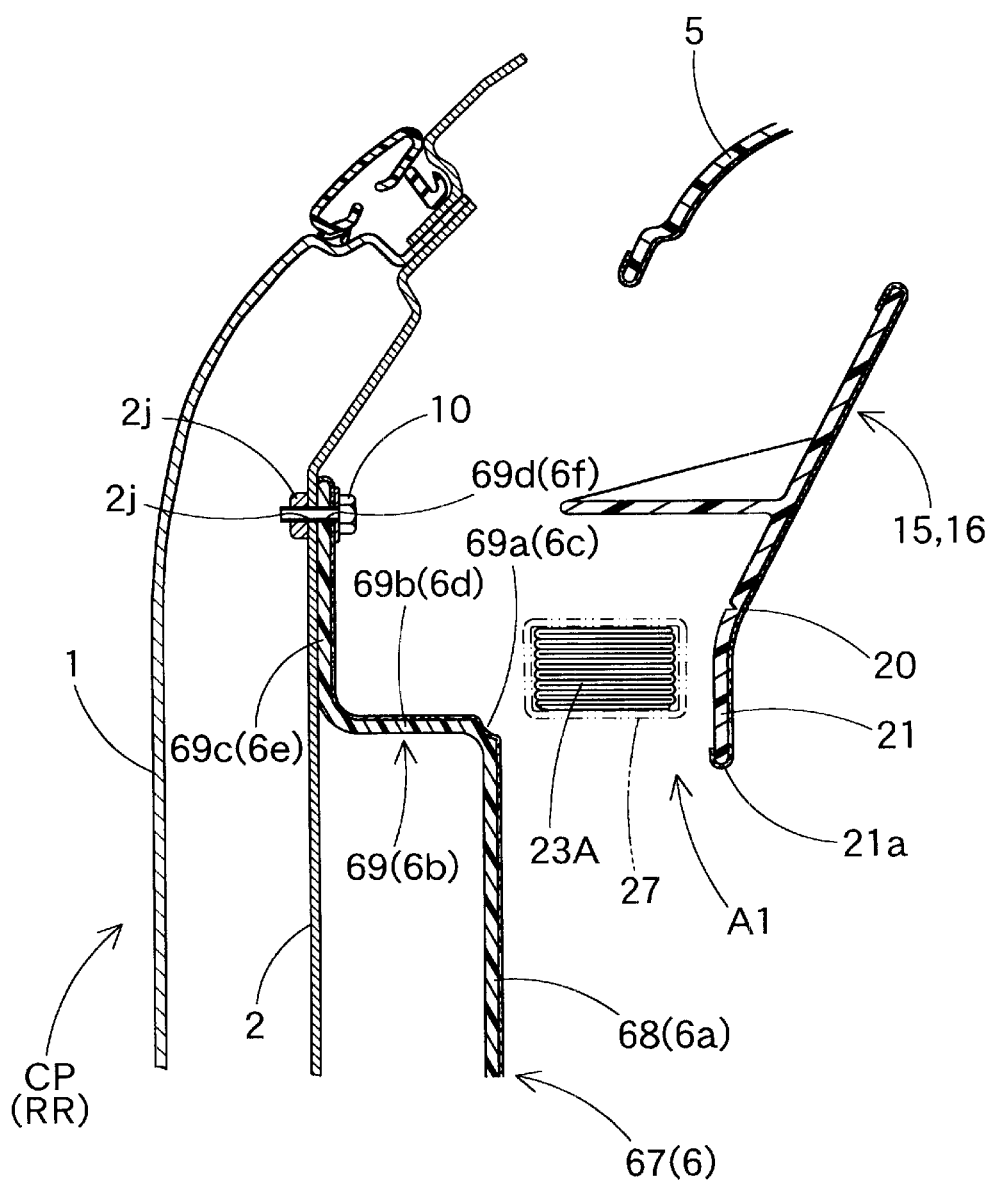
FIG. 22 is a sectional view of an air bag installation body in the third embodiment, which corresponds to a portion shown in FIG. 17.

In mounting the air bag apparatus M3 on a vehicle, each inflator main body portion 32 is connected to an operation signal inputting line, which extends from an air bag controlling circuit and which is not shown in the drawings. Before the air bag apparatus M3 is installed, center and rear pillar garnishes 67 and 6 of the center and rear pillar portions CP and RP are installed in the inner panel 2 by means of an installation bolt 10 or the like, as shown in FIG. 22. A front pillar garnish 4 of the front pillar portion FP and the roof head lining 5 are further installed in a vehicle in advance.

When inflator 31 is activated after the head protection air bag apparatus M3 is installed in a vehicle, a gas for inflation is emitted from the gas emitting exit 32c of the inflator main body portion 32. The gas for inflation flows into each air bag main body portion 24 through the gas flow portion 25. This causes each air bag main body 24 to inflate and tear the tape material 27 as well as further pushes the door portion 21 of the air bag cover 15 to open it. The main body portion 24 is developed and inflated so as to cover the opening W.

In the head protection air bag apparatus M3 in the third embodiment, the lower edge portion 21a of the air bag cover 15 is disposed closer to the interior side of a vehicle I than the upper edge portions 69 and 6b of the pillar garnishes 67 and 6. Thus, the air bag lower edge portion 21a can immediately open and move to the interior side of a vehicle I without climbing over the upper edge portions 69 and 6b of the pillar garnishes 67 and 6, when the developed and inflated air bag 23A pushes the air bag cover door portion 21.

Accordingly, in the head protection air bag apparatus M3 in the third embodiment, the opening operation of the air bag cover edge portion 21a operates in a smooth manner, so that development and inflation of the air bag 23A can be completed quickly.

Furthermore, in the third embodiment, the lower edge portion 21a of the air bag cover 15 is connected in a same plane as the general portions 68 and 6a of the pillar garnishes 67 and 6. Thus, the functional and decorative design characteristics of the abutting portions of the air bag cover 15 and the pillar garnishes 67 and 6 do not decrease.

In the third embodiment, the upper edge portions 69 and 6b of the pillar garnishes 67 and 6 fill a space between the pillar garnishes 67 and 6 and the inner panel 2 on a side of the body 1 by means of the lateral wall portions 69b and 6d and the installation portions 69c and 6e. Thus, the pillar garnish upper edge portions 69 and 6b prevent the air bag 23A from entering between the pillar garnishes 67 and 6 and the inner panel 2, when the air bag 23A is developed and inflated. Accordingly, pressure of the air bag 23A can be lead to a side of the lower edge portion 21a of the air bag cover 15. As a result, the door portion 21 can easily open and the air bag 23A would project to the interior side of a vehicle I smoothly.

In the third embodiment, the general portion 16 of the air bag cover 15 comprises the lateral wall portion 16a. The lateral wall portion 16a fills a space between the general portion 16 of the air bag cover 15 and the inner panel 2, above a location where a space is filled between the pillar garnishes 67 and 6 and the inner panel 2, and at a location above the folded air bag 23A. Thus, the lateral wall portion 16a prevents the air bag 23A from entering between the general portion 16 of the air bag cover 15 and the inner panel 2, when the air bag 23A is developed and inflated. Accordingly, the air bag 23A is directed to the door portion 21 of the air bag cover 15. As a result, the air bag 23A would be able to project smoothly to the interior side of a vehicle I.

In the third embodiment, the air bag cover 15 is provided on the interior side of a vehicle I within a range from the front pillar portion FP to the rear pillar portion RP with the center pillar portion CP in between as one body integrated. That is, one air bag cover 15 continuously covers substantially all over the upper edge side of a periphery of the opening W on the interior side of a vehicle I. Thus, in the third embodiment as was the first embodiment, a design characteristic of the interior side of a vehicle I can be improved compared with the case that the air bag cover is disposed in parts on the interior side of a vehicle.

Further, in the third embodiment, the upper edge portion 16c of the air bag cover 15 covers the interior side of a vehicle I of the lower edge portion 5a of the roof head lining 5 disposed above the air bag cover 15. That is, the upper edge portion 16c is disposed on the interior side of a vehicle I of the roof head lining lower edge portion 5a to be connected to the roof head lining 5. Thus, there is no problem even when a terminal treatment such as trimming of the roof head lining lower edge portion 5a is insufficient. This is because the air bag cover upper edge portion 16c covers the roof head lining lower edge portion 5a. Then, the terminal treatment of the roof head lining lower edge portion 5a can be easily performed. Decrease of the appearance design of the roof head lining 5 can be also controlled. The roof head lining 5 is usually vacuum molded and its terminal is given a trimming treatment. In the case that the terminal is exposed toward the interior side of a vehicle I, a terminal treatment such as trimming has been performed carefully with many processes so that the appearance design would not be decreased.

Moreover, in the third embodiment, the air bag apparatus M3 comprises the air bag installation body A1. The air bag installation body A1 is formed by installing into one body the assist grip 11, the air bag 23A, the inflator 31 and the air bag cover 15 by means of the installation bolts 35 and 29 and the spring plate nut 37. Thus, in installing the air bag apparatus M3 in a vehicle, only installing in a vehicle the air bag installation body Al formed into one body can mount the air bag apparatus M3 in the vehicle. As a result, effectiveness in operation for installing the air bag apparatus M3 in a vehicle can be improved. Handling such as transportation and control of each member before installation in a vehicle would be easy, of course, since the air bag apparatus M3 is formed into one body as the air bag installation body A1.

In the head protection air bag apparatus M3 in the third embodiment, of course, the inflator 31 is disposed in a location on the exterior side of a vehicle O of the assist grip 11F to be fixed in the inner panel 2 on a side of the body 1. That is, the assist grip 11F functions as a cover material of the inflator 31. The assist grip itself is provided with the core material 11a made of a metal, while it is provided on its surface side with the cover layer 11b. The cover layer 11b is made of a soft synthetic resin such as soft vinyl chloride and urethane so as to provide a cushion characteristic.

Therefore, a passenger will impact the assist grip 11F, which has the characteristic of a cushion, in situations when the passenger would impact the inflator. As a result, the impact of the passenger is less injurious than an impact in situations when no assist grip is provided.

In the third embodiment, the inflator 31 is disposed in the roof side rail portion RR between the front pillar portion FP and the center pillar portion CP. However, the inflator 31 may be disposed in a location proximate to the assist grip 11B, between the center pillar portion CP and the rear pillar portion RP, provided that the gas flow portion 25 of the air bag 23A corresponds to the arrangement.

Figure 23:
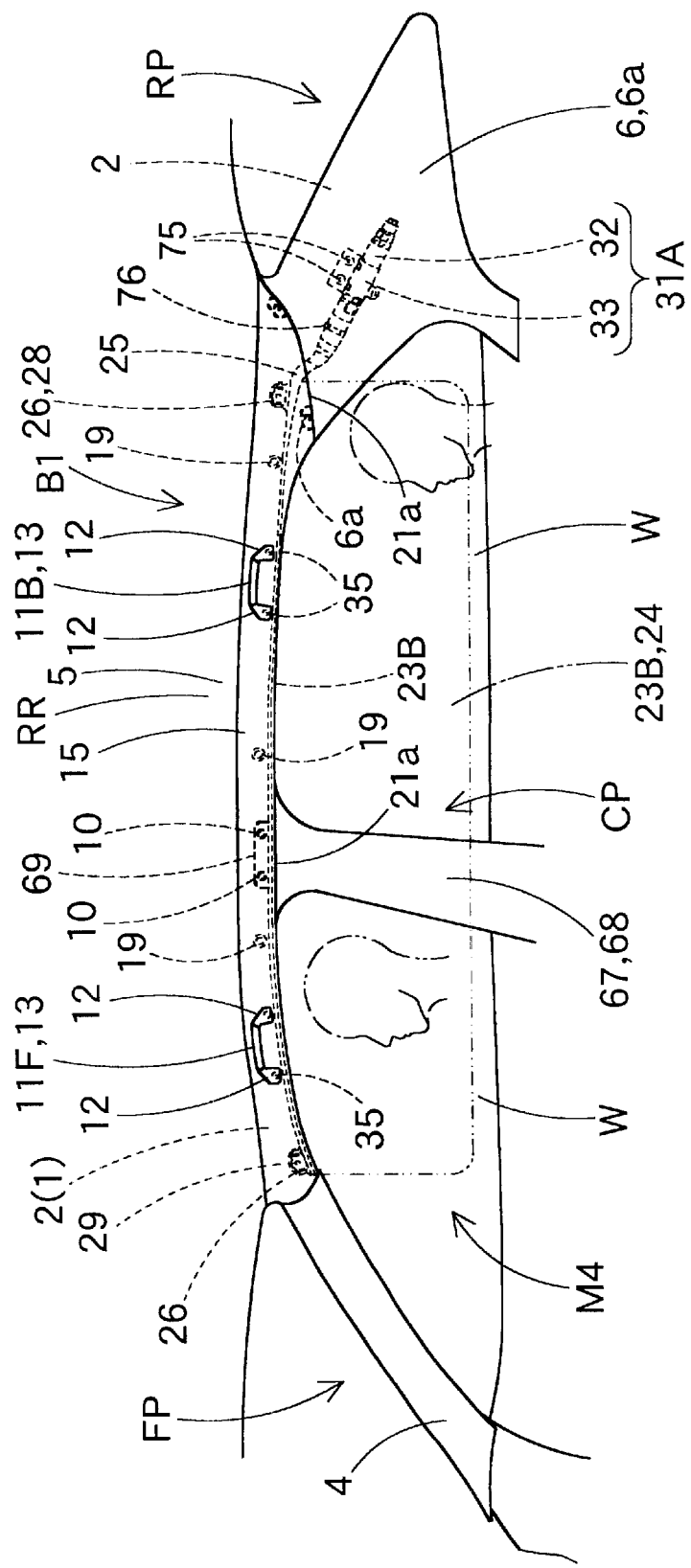
FIG. 23 is a front view of a head protection air bag apparatus in the fourth embodiment from the interior side of a vehicle.

Further, an arrangement may be that of the fourth embodiment shown in FIG. 23, so arranged that the door portion 21 of the air bag cover 15 can open smoothly. In the head protection air bag apparatus M4 in the fourth embodiment, an inflator 31A is fixed in the inner panel 2 of the rear pillar portion RP so as to be covered by the rear pillar garnish 6.

The inflator 31A comprises a main body portion 32 and a bracket portion 33. The main body portion 32 is in a cylindrical shape and emits a gas for inflation. The bracket portion 33 grips the main body portion 32. The bracket portion 33 fixes the main body portion 32 in the inner panel 2 by means of bolt 75. An air bag 23B comprises a main body portion 24 covering an opening W, an installation portion 26, and a gas flow portion 25. The gas flow portion 25 is provided in an upper part of the rear end of the main body portion 24. The gas flow portion 25 is connected to the inflator main body portion 32 by means of a clamp 76.

There is also no inflator 31 provided in a location proximate to the assist grip 11F on the front side, or proximate to the assist grip 11B.

Other portions are the same as the third embodiment. An upper edge portion 6b of the rear pillar garnish 6 is disposed only in a location of the air bag, which is developed and inflated. That is, a part of a lateral wall portion 6d (see FIG. 17) is opened in an upper location, where the inflator 31A is disposed, so that the gas flow portion 25 can be connected to the inflator main body portion 32.

The air bag apparatus M4 comprises an air bag installation body B1 that includes the assist grips 11F and 11B, the air bag cover 15 and the air bag 23B, formed into one body by means of the bolts 35 and 29 and the nut 37. The air bag installation body B1 similar to the air bag installation body A1 in the third embodiment with the inflator 31 is detached from the air bag installation body A1.

Accordingly, also in the fourth embodiment, the air bag 23B and the air bag cover 15 are formed into one installation body B1 that can be installed in the vehicle body. Accordingly, the ease of installation for installing the air bag apparatus M4 in a vehicle is improved.

The gas flow portion 25 is connected in advance to the inflator main body portion 32, which is being covered by the rear pillar garnish 6, by means of the clamp 76. The air bag installation body B1 is installed in the inner panel 2 by means of the bolts 35 and 29.

It may be possible to install in advance the inflator 31A in the air bag installation body B1 by means of the clamp 76. In this case, the inflator 31A is fixed in the inner panel 2 on a back surface side of the rear pillar garnish 6 by means of an opening portion of the lateral wall portion 6d when the air bag installation body B1 is installed in a vehicle. After that, the air bag installation body B1 is installed in the inner panel 2 by means of the bolts 35 and 29.

Of course, other operations and effects can be obtained in the air bag apparatus M4 in the fourth embodiment as was the case of the third embodiment.

The head protection air bag apparatuses M1 and M2 in the first and second embodiments are mounted in a vehicle, which is provided with two middle pillar portions P1 and P2 between the front pillar portion FP and the rear pillar portion RP.

The head protection air bag apparatuses M3 and M4 in the third and fourth embodiments are mounted in a vehicle, which is provided with a center pillar portion CP as a middle pillar portion between the front pillar portion FP and the rear pillar portion RP.

The head protection air bag apparatus according to the invention, however, can be mounted in a vehicle having a different number of middle pillar portions. That is, the head protection air bag apparatus according to the invention can be mounted in a vehicle, which is provided with one, two, three or more middle pillar portions between the front pillar portion FP and the rear pillar portion RP.

It will be understood by those of ordinary skill in the art that changes and modifications can be made to elements of this invention that would remain within the scope of the invention defined in the appended claims.

What is claimed is:

1. A vehicle body and a head protection air bag apparatus mounted in the vehicle body, the air bag apparatus comprising:
   an air bag;
   an inflator coupled to the air bag for supplying said air bag with a gas for inflation;
   fixing elements that fixes said inflator to the vehicle body; and
   an assist grip including a hand grasping grip portion for placement in the interior of the vehicle body; said hand grasping grip portion defining a grasping surface thereon, said assist grip coupled to the inflator at a location proximate to the inflator;
   wherein said inflator is disposed toward the exterior side of the vehicle body, relative to the grasping surface of the assist grip.

2. The vehicle body and head protection air bag apparatus according to claim 1, comprising:
   an air bag cover for covering said air bag, said air bag cover including an interior surface for facing toward the interior of the vehicle body, and an exterior surface for facing toward the exterior side of the vehicle body; said cover defining a vehicle body interior side and an exterior side relative to the cover; said cover moving between a closed position and an open position;
   wherein said air bag is coupled to the cover and disposed on the vehicle body exterior side relative to the cover such that the air bag is covered by said air bag cover; and
   wherein upon inflation of the air bag, the gas for inflation from said inflator is emitted into said air bag so that said air bag pushes and opens said air bag cover.

3. The vehicle body and head protection air bag apparatus according to claim 1, wherein
   said inflator is disposed toward the exterior side of the vehicle body in an obliquely upper direction relative to said assist grip.

4. The vehicle body and head protection air bag apparatus according to claim 1, wherein
   said inflator is disposed toward the exterior side of the vehicle body in a generally horizontal direction relative to said assist grip.

5. The vehicle body and head protection air bag apparatus according to claim 1, wherein
   said inflator and said assist grip are both fixed to said vehicle body by said fixing elements.

6. The vehicle body and head protection air bag apparatus according to claim 2, wherein
   said inflator, said assist grip and said air bag cover are all fixed to said vehicle body by said fixing elements.

7. The vehicle body and head protection air bag apparatus according to claim 2, comprising:
   an air bag installation body; wherein said assist grip, said air bag, said inflator, and said air bag cover are coupled together into one air bag installation body,
   wherein said air bag installation body is installed as a unit in said vehicle body.

8. The vehicle body and head protection air bag apparatus according to claim 2, wherein
   said air bag cover is a roof side rail garnish.

9. The vehicle body and head protection air bag apparatus according to claim 2, wherein
   said air bag cover is a roof head lining.

10. The vehicle body and head protection air bag apparatus according to claim 2, wherein the cover includes an installation portion, and wherein the assist grip includes an installation portion, opposite the hand grasping surface; said cover and assist grip installation portions disposed for mating engagement.

11. The vehicle body and head protection air bag apparatus according to claim 10, wherein the inflator includes a main body portion and a bracket portion; said main body portion disposed within the bracket portion; said bracket portion including an installation portion; and wherein said inflator bracket portion is disposed immediately vertically above the installation portion of the cover.

12. The vehicle body and head protection air bag apparatus according to claim 11, wherein the air bag is disposed immediately vertically beneath the installation portion of the cover.

13. A vehicle body and a head protection air bag apparatus mounted in a vehicle body, the vehicle body comprising:

a pillar, a pillar garnish disposed on the interior side of the pillar; the pillar garnish including a general portion and an upper edge portion;

the air bag apparatus comprising:

an air bag, supported in a folded condition by the upper edge portion of the pillar garnish, an air bag cover, which covers said folded air bag and which is configured to be moved from a closed position to an open position when pushed by said air bag; the air bag disposed toward the exterior side of the vehicle body relative to the cover;

the cover further including a lower edge portion disposed toward the interior side of the vehicle body relative to the pillar garnish, the lower edge portion is abutted to the general portion of the pillar garnish when the cover is in the closed position; and said vehicle body comprises a roof head lining disposed above said air bag cover, the roof head lining including a lower edge portion, and wherein the air bag cover includes an upper edge portion, the upper edge portion of said air bag cover is disposed on the interior side of the vehicle body relative to said head roof head lining lower edge portion so as to cover a portion of the roof head lining lower edge portion, and wherein the upper edge portion of the cover is abutted to said roof head lining.

14. The vehicle body and head protection air bag apparatus according to claim 13, wherein said lower edge portion of said air bag cover is abutted to said pillar garnish so as to be in a same plane with said general portion of the pillar garnish.

15. The vehicle body and head protection air bag apparatus according to claim 13, wherein said vehicle body comprises a front pillar portion, a rear pillar portion and a middle pillar portion between said front pillar portion and said rear pillar portion, and said air bag cover is provided to extend from said front pillar portion to the rear pillar portion as one integrated body.

16. The vehicle body and head protection air bag apparatus according to claim 13, comprising an air bag installation body comprising said air bag and said air bag cover coupled together into one body, wherein the air bag installation body is installed in the said vehicle body.

17. The vehicle body and head protection air bag apparatus according to claim 13, wherein the pillar garnish general portion is disposed at a distance from the pillar, and the upper edge portion of said pillar garnish is connected to said vehicle body so as to fill the space between said pillar garnish and the pillar.

18. The vehicle body and head protection air bag apparatus according to claim 17, wherein said air bag cover comprises a door portion configured to move between a closed position and an open position, the door portion configured to be opened when pushed by the air bag when the air bag is developed and inflated, and a general portion disposed at a location above said door portion, wherein, said general portion is disposed at a spaced apart distance from the vehicle body, said general portion of said air bag cover is provided with a lateral wall portion for filling the space between the general portion of said air bag cover and the vehicle body, and wherein the lateral wall portion of the air bag cover is disposed in a location above said folded air bag.

19. The vehicle body and head protection air bag apparatus according to claim 17, wherein the upper edge portion of the pillar garnish includes a lateral wall portion attached to the general portion and extending toward the vehicle body exterior relative to the general portion, and wherein the folded air bag is supported on the lateral wall portion.

20. A vehicle body and a head protection air bag apparatus mounted in the vehicle body, the air bag apparatus comprising:

an air bag;

an inflator coupled to the air bag for supplying said air bag with a gas for inflation;

fixing elements that fixes said inflator to the vehicle body; and an assist grip including a hand grasping grip portion for placement in the interior of the vehicle body; said hand grasping grip portion defining a grasping surface thereon, said assist grip mounted at a location proximate to the inflator;

wherein said inflator is disposed toward the exterior side of the vehicle body, relative to the grasping surface of the assist grip.

21. The vehicle body and head protection air bag apparatus according to claim 20, comprising:

an air bag cover for covering said air bag, said air bag cover including an interior surface for facing toward the interior of the vehicle body, and an exterior surface for facing toward the exterior side of the vehicle body; said cover defining a vehicle body interior side and an exterior side relative to the cover; said cover moving between a closed position and an open position;

wherein said air bag is coupled to the cover and disposed on the vehicle body exterior side relative to the cover such that the air bag is covered by said air bag cover; and wherein upon inflation of the air bag, the gas for inflation from said inflator is emitted into said air bag so that said air bag pushes and opens said air bag cover.

22. The vehicle body and head protection air bag apparatus according to claim 20, wherein said inflator is disposed toward the exterior side of the vehicle body in an obliquely upper direction relative to said assist grip.

23. The vehicle body and head protection air bag apparatus according to claim 20, wherein said inflator is disposed toward the exterior side of the vehicle body in a generally horizontal direction relative to said assist grip.

24. The vehicle body and head protection air bag apparatus according to claim 20, wherein said inflator and said assist grip are both fixed to said vehicle body by said fixing elements.

* * * * *